United States Patent
Khoshnevisan et al.

(10) Patent No.: US 12,382,472 B2
(45) Date of Patent: *Aug. 5, 2025

(54) TECHNIQUES FOR DETERMINING GROUP IDENTIFICATION AND A DOWNLINK ASSIGNMENT INDEX FOR ENHANCED DYNAMIC CODEBOOKS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,956

(22) Filed: Nov. 17, 2023

(65) Prior Publication Data
US 2024/0349291 A1    Oct. 17, 2024

Related U.S. Application Data

(63) Continuation of application No. 17/196,529, filed on Mar. 9, 2021, now Pat. No. 11,849,462.
(Continued)

(51) Int. Cl.
*H04W 72/00*    (2023.01)
*H04B 7/0417*    (2017.01)
(Continued)

(52) U.S. Cl.
CPC .......... *H04W 72/23* (2023.01); *H04B 7/0417* (2013.01); *H04B 7/0482* (2013.01)

(58) Field of Classification Search
None
See application file for complete search history.

(56) References Cited

U.S. PATENT DOCUMENTS 9,999,039 B2    6/2018    Vajapeyam et al.
10,743,338 B2    8/2020    Hosseini et al.
(Continued)

FOREIGN PATENT DOCUMENTS

WO    WO-2017015528        1/2017
WO    WO-2018175396 A1    9/2018
(Continued)

OTHER PUBLICATIONS

3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3-p. 18, line 8, paragraph [0010], Section 9, clauses 6, 9.2.1, 10.2 and 12, chapter 11.1 on p. 114-116.
(Continued)

*Primary Examiner* — Abdelillah Elmejjarmi
(74) *Attorney, Agent, or Firm* — Dalei Dong; Holland & Hart LLP

(57) ABSTRACT

Methods, systems, and devices for wireless communications are described. A user equipment (UE) may receive one or more downlink control information (DCI) messages scheduling downlink transmissions associated with different groups, where feedback for the downlink transmissions may be transmitted during a same time period. The UE may index the received DCI messages based on a set of serving cell indices and monitoring occasion indices, and the UE may select a DCI message from the indexed DCI messages. The UE may identify, based on an index associated with the DCI messages, a first DCI message that has a format that includes a group index field. The UE may identify, from the group index field of the identified DCI message, a group index
(Continued)

value that indicates a first group, and the UE may transmit a feedback message that includes at least a codebook that is based on the group index value.

30 Claims, 12 Drawing Sheets

Related U.S. Application Data

(60) Provisional application No. 63/007,837, filed on Apr. 9, 2020.

(51) Int. Cl.
*H04B 7/0456* (2017.01)
*H04W 72/23* (2023.01)

(56) References Cited

U.S. PATENT DOCUMENTS

| | | | |
|---|---|---|---|
| 2018/0041948 | A1 | 2/2018 | Chou et al. |
| 2020/0044791 | A1 | 2/2020 | Tsai et al. |
| 2020/0106568 | A1 | 4/2020 | Tsai et al. |
| 2020/0322097 | A1 | 10/2020 | Hsieh et al. |
| 2020/0396760 | A1 | 12/2020 | Yi et al. |
| 2021/0314102 | A1 | 10/2021 | Li et al. |
| 2021/0321438 | A1 | 10/2021 | Khoshnevisan et al. |
| 2022/0110150 | A1 | 4/2022 | Lin et al. |
| 2022/0278807 | A1 | 9/2022 | Zhang et al. |
| 2022/0294573 | A1 | 9/2022 | Lei et al. |
| 2022/0361211 | A1 | 11/2022 | Karaki et al. |

FOREIGN PATENT DOCUMENTS

| | | |
|---|---|---|
| WO | WO-2019144833 A1 | 8/2019 |
| WO | WO-2021065864 A1 | 4/2021 |
| WO | WO-2021097656 A1 | 5/2021 |

OTHER PUBLICATIONS

Huawei, et al., "HARQ Enhancements in NR Unlicensed", 3GPP Draft, R1-1910047, 3GPP TSG RAN WG1 Meeting #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809061, 12 Pages, p. 1, Line 8-p. 12, Line 11.
Huawei: "Feature Lead Summary#3 of HARQ Enhancements for NR-U", 3GPP Draft, R1-1913561, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019 (Nov. 25, 2019), XP051830840, pp. 1-41, p. 1, line 7-p. 41, line 17.
International Preliminary Report on Patentability—PCT/US2021/021649—The International Bureau of WIPO—Geneva, Switzerland—Oct. 20, 2022.
International Search Report and Written Opinion—PCT/US2021/021649—ISA/EPO—Jun. 29, 2021.
Qualcomm Incorporated: "Enhancements to Scheduling and HARQ Operation for NR-U," 3GPP TSG RAN WG1 Meeting #99, R1-1912940, 3rd Generation Partnership Project, Mobile Competence Centre, 650, Route Des Lucioles, F-06921, Sophia-Antipolis Cedex, France, vol. RAN WG1. No. Reno. Nevada. USA, Nov. 18, 2019-Nov. 22, 2019, Nov. 9, 2019, XP051823703, 14 pages.
Huawei: "Feature Lead Summary#3 of HARQ Enhancements for NR-U", 3GPP TSG RAN WG1 Meeting #99, R1-1913561, Reno, USA, Nov. 18-22, 2019, Nov. 26, 2019, 41 Pages, p. 2-16.
Huawei: "Feature Lead Summary#3 of HARQ Enhancements for NR-U", 3GPP TSG RAN WG1 Meeting #99, R1-1913561, Reno, USA, Nov. 18-22, 2019, 41 Pages, Chapters 2.1.1.1 to 2.1.1.4, pp. 14 to 18 and 33.
Taiwan Search Report—TW110108701—TIPO—Nov. 29, 2024.
European Search Report—EP25157202—Search Authority—The Hague—May 12, 2025.

ns in an ascending order) the received
DCI messages across monitoring occasion indices. In such

TECHNIQUES FOR DETERMINING GROUP IDENTIFICATION AND A DOWNLINK ASSIGNMENT INDEX FOR ENHANCED DYNAMIC CODEBOOKS

CROSS REFERENCE

The present Application for Patent is a continuation of U.S. patent application Ser. No. 17/196,529, filed Mar. 9, 2021, which claims the benefit of U.S. Provisional Patent Application No. 63/007,837, filed Apr. 9, 2020, assigned to the assignee hereof, and expressly incorporated by reference in its entirety herein.

FIELD OF DISCLOSURE

The following relates to wireless communications and more specifically to techniques for determining group identification and a downlink assignment index for enhanced dynamic codebooks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and base station may use error correction techniques, such as hybrid automatic repeat request (HARQ) feedback, for communications between the devices. The HARQ feedback may be used to identify and correct for errors in transmitted data, where the feedback may include an acknowledgment (ACK) or a negative acknowledgment (NACK). In some cases, the UE may transmit feedback for one or more groups of downlink transmissions from the base station. However, the availability of various parameters associated with the one or more groups may result in some ambiguity and/or complexity when the UE generates its feedback.

SUMMARY

The described techniques relate to improved methods, systems, devices, and apparatuses that support techniques for determining group identification and a downlink assignment index for enhanced dynamic codebooks. The described techniques enable a UE to accurately generate feedback for one or more groups of downlink transmissions. For example, a wireless communications system may support codebook-based hybrid automatic repeat request (HARQ) feedback (e.g., HARQ using an enhanced dynamic codebook). In such systems, a UE may transmit, to a base station, a number of information bits within a HARQ-acknowledgment (ACK) codebook. As an example, the UE may monitor for downlink control information (DCI) during one or more monitoring occasions, where the control information may indicate one or more scheduled downlink transmissions (e.g., including data transmitted via a physical downlink shared channel (PDSCH)) for the UE. The UE may indicate whether each downlink transmission was successfully detected and received (e.g., decoded) using respective information bits (e.g., feedback bits such as an ACK bit or a negative acknowledgment (NACK) bit). In addition, different downlink transmissions may be associated with different groups (e.g., a first scheduled PDSCH may be associated with a first PDSCH group, a second scheduled PDSCH may be associated with a second PDSCH group, and so forth), and DCI may indicate which group a scheduled downlink transmission is associated with. The UE may accordingly report feedback (e.g., one or more information bits in a first codebook) for downlink transmissions of the first group and feedback (e.g., one or more information bits in a second codebook) for downlink transmission of the second group. Further, the feedback for multiple downlink transmissions of one or more groups may be transmitted (e.g., via a physical uplink control channel (PUCCH)) during a same time period (e.g., during a same slot).

The UE may utilize a rule for determining a group associated with one or more downlink transmissions. For instance, the UE may receive one or more DCI messages scheduling the downlink transmissions for various groups, where the DCI messages may have the same or different formats (e.g., from a set of DCI formats). Based on an index associated with each respective DCI message of the received DCI messages, the UE may select a last DCI message that includes a group index field (e.g., based on a format of the DCI message). For instance, the UE may index the received DCI messages (e.g., in an ascending order) across serving cell indices and for a same monitoring occasion, and the UE may further index (e.g., in an ascending order) the received DCI messages across monitoring occasion indices. In such cases, the UE may select the last DCI message based on the indexing (or ordering) performed by the UE.

The group index field may provide the UE with a group index value of a first group that is used for generating a codebook associated with the first group. The UE may then transmit the feedback message that includes at least the codebook associated with downlink transmissions for the first group. In some aspects, the UE may also identify a total downlink assignment index (DAI) value for another group based on the identified group index. As an example, the UE may identify a total DAI value for a non-scheduled group (e.g., a second group that is scheduled by another DCI message that is different from the selected DCI message) based on a value of the group index. Here, the UE may utilize a total DAI value from the selected DCI message (e.g., a last DCI message that includes the group index field) or the UE may use an empty value for the total DAI value when generating of a codebook for the second group sent within the feedback message.

A method for wireless communication is described. The method may include receiving one or more DCI messages that schedule one or more groups of downlink transmissions, where a feedback message for the one or more downlink transmissions is to be transmitted during a same time period, identifying, based on an index associated with the one or more DCI messages, a first DCI message from the one or more DCI messages, the first DCI message including a group index field in accordance with a format of the first DCI message, identifying, from the group index field of the first DCI message, a group index value indicating a first group from the one or more groups of downlink transmissions, and transmitting, during the same time period, the feedback message for the one or more groups of downlink transmissions, the feedback message being based on the identified group index value.

An apparatus for wireless communication is described. The apparatus may include a processor, memory coupled with the processor, and instructions stored in the memory. The instructions may be executable by the processor to cause the apparatus to receive one or more DCI messages that schedule one or more groups of downlink transmissions, where a feedback message for the one or more downlink transmissions is to be transmitted during a same time period, identify, based on an index associated with the one or more DCI messages, a first DCI message from the one or more DCI messages, the first DCI message including a group index field in accordance with a format of the first DCI message, identify, from the group index field of the first DCI message, a group index value indicating a first group from the one or more groups of downlink transmissions, and transmit, during the same time period, the feedback message for the one or more groups of downlink transmissions, the feedback message being based on the identified group index value.

Another apparatus for wireless communication is described. The apparatus may include means for receiving one or more DCI messages that schedule one or more groups of downlink transmissions, where a feedback message for the one or more downlink transmissions is to be transmitted during a same time period, means for identifying, based on an index associated with the one or more DCI messages, a first DCI message from the one or more DCI messages, the first DCI message including a group index field in accordance with a format of the first DCI message, means for identifying, from the group index field of the first DCI message, a group index value indicating a first group from the one or more groups of downlink transmissions, and means for transmitting, during the same time period, the feedback message for the one or more groups of downlink transmissions, the feedback message being based on the identified group index value.

A non-transitory computer-readable medium storing code for wireless communication is described. The code may include instructions executable by a processor to receive one or more DCI messages that schedule one or more groups of downlink transmissions, where a feedback message for the one or more downlink transmissions is to be transmitted during a same time period, identify, based on an index associated with the one or more DCI messages, a first DCI message from the one or more DCI messages, the first DCI message including a group index field in accordance with a format of the first DCI message, identify, from the group index field of the first DCI message, a group index value indicating a first group from the one or more groups of downlink transmissions, and transmit, during the same time period, the feedback message for the one or more groups of downlink transmissions, the feedback message being based on the identified group index value.

Some examples of the method, apparatuses, and non-transitory computer-readable medium described herein may further include operations, features, means, or instructions for identifying a total DAI value for a second group that may be different from the first group based on the identified group index value from the first DCI message, where the feedback message may be based on the identified total DAI value for the second group.

In some examples of the method, apparatuses, and non-transitory computer-readable medium described herein, identifying the total DAI value for the second group may include operations, features, means, or instructions for determining that the first group includes a first predetermined group based on the identified group index value, receiving a second DCI message excluding the group index field in accordance with a format of the second DCI message, where the second DCI message may be after the first DCI message, and setting the total DAI value for the second group to a first value based on the determination.

In some examples of the method, apparatuses, and non-transitory computer-readable medium described herein, the first value includes a null value or an empty value.

Some examples of the method, apparatuses, and non-transitory computer-readable medium described herein may further include operations, features, means, or instructions for generating a second codebook for the second group using a value of a counter DAI of the second DCI message based on setting the total DAI value to the null value or the empty value, where the feedback message includes the second codebook.

In some examples of the method, apparatuses, and non-transitory computer-readable medium described herein, identifying the total DAI value for the second group may include operations, features, means, or instructions for determining that the first group includes a second predetermined group based on the identified group index value and identifying the total DAI value from the first DCI message based on the determination.

In some examples of the method, apparatuses, and non-transitory computer-readable medium described herein, identifying the total DAI value for the second group may include operations, features, means, or instructions for receiving a second DCI message excluding the group index field in accordance with a format of the second DCI message, where the second DCI may be after the first DCI message and identifying the total DAI value from the first DCI message based on the second DCI message excluding the group index field.

In some examples of the method, apparatuses, and non-transitory computer-readable medium described herein, identifying the total DAI value for the second group may include operations, features, means, or instructions for identifying the total DAI value from the first DCI message based on a format of the first DCI message.

Some examples of the method, apparatuses, and non-transitory computer-readable medium described herein may further include operations, features, means, or instructions for indexing the received one or more DCI messages in an ascending first order across the set of serving cell indices for a same monitoring occasion and indexing, based on the ascending first order, the received one or more DCI messages in an ascending second order across the set of monitoring occasion indices.

In some examples of the method, apparatuses, and non-transitory computer-readable medium described herein, receiving the one or more DCI messages may include operations, features, means, or instructions for receiving a second DCI message excluding the group index field in accordance with a format of the second DCI message, where the first DCI message may be selected based on the second DCI message excluding the group index field.

In some examples of the method, apparatuses, and non-transitory computer-readable medium described herein, the format of the second DCI message includes a fallback DCI format.

In some examples of the method, apparatuses, and non-transitory computer-readable medium described herein, the format of the second DCI message includes a non-fallback DCI format that excludes the group index field.

In some examples of the method, apparatuses, and non-transitory computer-readable medium described herein, receiving the one or more DCI messages may include operations, features, means, or instructions for receiving a third DCI message including the group index field in accordance with a format of the third DCI message, where the first DCI message may be selected based on the first DCI message being ordered after the third DCI message.

Some examples of the method, apparatuses, and non-transitory computer-readable medium described herein may further include operations, features, means, or instructions for determining, based on the indexing, that the first DCI message may be a last DCI message including the group index field.

Some examples of the method, apparatuses, and non-transitory computer-readable medium described herein may further include operations, features, means, or instructions for identifying, from the first DCI message, a value of a first new feedback indication field for the first group, a number of requested groups, a value of a second new feedback indication field for a second group that may be different from the first group, or a combination thereof.

In some examples of the method, apparatuses, and non-transitory computer-readable medium described herein, generating, based on one or more fields of the first DCI message, the first codebook for the first group and a second codebook for a second group that may be different from the first group, where the feedback message includes the first codebook, the second codebook, or a combination thereof.

In some examples of the method, apparatuses, and non-transitory computer-readable medium described herein, each of the one or more DCI messages may have a DCI format from a set of DCI formats.

In some examples of the method, apparatuses, and non-transitory computer-readable medium described herein, the format of the first DCI message includes a non-fallback DCI format.

DETAILED DESCRIPTION

Figure 1:
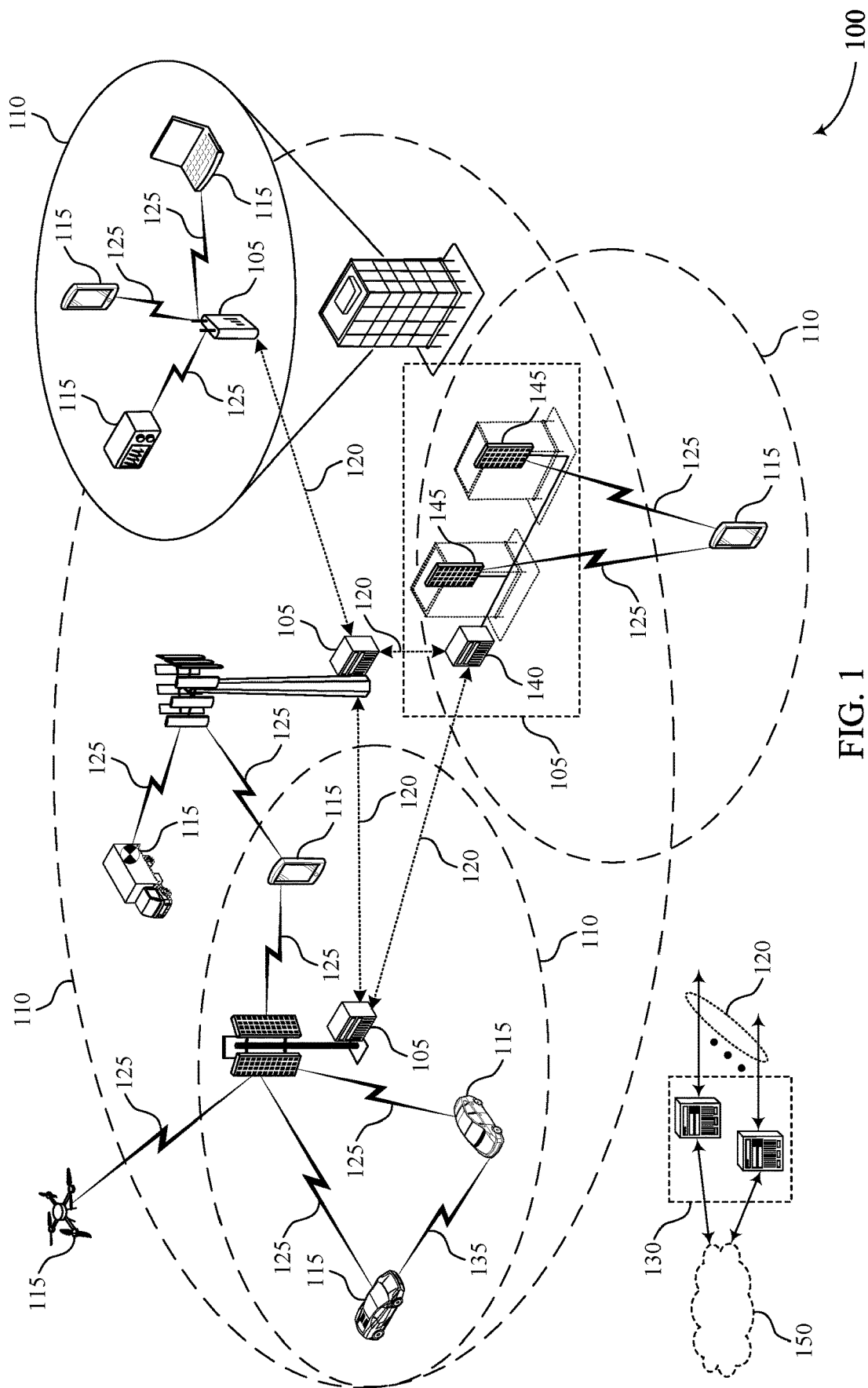
FIG. 1 illustrates an example of a wireless communications system that supports techniques for determining group identification and a downlink assignment index (DAI) for enhanced dynamic codebooks in accordance with various aspects of the present disclosure.

In some wireless communications systems, a user equipment (UE) may use hybrid automatic repeat request (HARQ) feedback to ensure reception of data transmitted within the system. For example, a UE may send HARQ feedback transmissions that include an acknowledgment (ACK) or negative acknowledgment (NACK) for data transmitted to the UE. In some cases, a flexible frame structure and dynamic indications of HARQ feedback timing may be used. As such, a time offset between reception of a downlink message (e.g., a physical downlink shared channel (PDSCH), a physical downlink control channel (PDCCH)) and transmission of corresponding HARQ feedback may be variable. The system may also utilize codebook-based HARQ feedback, where multiple HARQ feedback indications (e.g., ACK/NACK) may be transmitted simultaneously on a single feedback occasion (e.g., within a feedback report), and respective information bits representing detected messages may be encoded in a HARQ-ACK codebook.

In some cases, a UE may transmit different types of HARQ-ACK codebooks. For instance, a semi-static codebook may be used, where a HARQ feedback bit for a potential downlink message may be reserved in a semi-static codebook (e.g., of a fixed size, regardless of the actual transmission of the downlink message). Additionally or alternatively, a dynamic codebook may be used, where information bits may be conditionally added to the codebook based on, for example, the detection of a downlink message (e.g., a downlink control information (DCI) message). Here, the UE may construct a codebook having a size that corresponds to the number of downlink transmissions detected and the corresponding information bits included in the HARQ-ACK codebook, which may reduce overhead in feedback signaling.

In some examples, one or more downlink transmissions transmitted from the base station may be configured or organized into groups. In such examples, the UE may be configured to provide group-based HARQ feedback to the base station, which may realize efficient communications in the wireless communications system. Group-based feedback may also be referred to as enhanced dynamic acknowledgment feedback, and a group-based acknowledgment feedback codebook may be referred to as an enhanced dynamic codebook. Using such codebook-based HARQ feedback schemes, the UE may determine feedback for each group of downlink transmissions. For example, the UE may identify first feedback (e.g., a first HARQ-ACK codebook) for a first group, second feedback (e.g., a second HARQ-ACK codebook) for a second group, etc. Such feedback may include an indication of whether the UE successfully received and decoded the one or more downlink transmissions for each group (e.g., an ACK indicating successful decoding of a downlink transmission or a NACK indicating a failed reception or a failed decoding of the downlink transmission). In some cases, the DCI received by the UE may provide a set of parameters that the UE uses for generating one or more codebooks. For instance, the DCI may include a group index field that identifies a group of the scheduled downlink transmission and downlink assignment index (DAI) fields (e.g., such as a counter DAI and total DAI) that may account for the number of downlink transmissions (e.g., for each group). In addition, a new feedback indicator (NFI) may toggle whether a DAI for a group is reset, which may indicate what information in include in the generated codebook. In some examples, one or more fields within DCI (such as an NFI for a non-scheduled group (i.e., a group scheduled by another DCI, but for which the UE may provide feedback) and a total DAI for the non-scheduled group) may be present or absent based on a configuration (e.g., a radio resource control (RRC) configuration) provided to the UE.

However, in some cases, when a UE receives various DCI formats scheduling groups of downlink communications, reporting HARQ feedback for different groups of downlink transmissions using enhanced dynamic codebooks may be complex or may result in a degree of ambiguity in feedback procedures, or both. For example, some DCI formats (e.g., non-fallback DCI, such as DCI format 1_1) may include the various fields, such as the DAI, NFI, group index, etc., for a group scheduled by the DCI, as well as one or more fields for another (e.g., non-scheduled) group. But some DCI formats (e.g., fallback DCI, such as DCI format 1_0, or other non-fallback DCI formats, such as DCI format 1_2) may exclude these fields. As such, when the UE is configured with an enhanced dynamic codebook, based on the format of the received DCI, the UE may report feedback based on various assumptions related to the corresponding PDSCH (e.g., using preconfigured rules or a last received DCI). As an example, for a PDSCH scheduled by a fallback DCI, the UE may report HARQ feedback for the PDSCH as part of a predetermined group (e.g., group 0). Further, the UE may receive another DCI that includes an indicator (e.g., in an NFI field corresponding to a parameter h) associated with one or more groups, and the UE may utilize the indicator in the other received DCI when determining the HARQ codebook. Based on the assumptions made by the UE, the UE may be required to consider one group as a latest group, and if feedback for another group is also requested (e.g., when a number of requested PDSCH group(s) field corresponding to a parameter, q, indicates multiple groups), then the UE may multiplex feedback for both groups when sending a feedback message (e.g., via a physical uplink control channel (PUCCH)). But it may be ambiguous as to which group may be considered the latest group when multiple downlink transmissions (and DCI messages) are received. In addition, if a most recently received DCI is formatted as a fallback DCI, the UE may not be provided with various fields to generate the feedback/codebook for the multiple groups. In some cases, it also may not be clear to the UE as to when to use information associated with different groups that are being reported (such as a total DAI value for a non-scheduled group), which may be further complicated if the last (e.g., most recently received) DCI is a fallback DCI.

As described herein, various techniques may be used that enable group determination for reporting HARQ feedback, where a rule may be used to determine a last group, g, for which a codebook may be generated. The rule may include identifying a set of DCI messages that schedule PDSCH reception for which corresponding HARQ feedback is to be transmitted in a same time interval (e.g., via PUCCH during a same slot). In some examples, the DCI messages may be indexed (e.g., in an ascending order) across serving cell indices for a same PDCCH monitoring occasion and then indexed (e.g., in ascending order) across PDCCH monitoring occasion indices. Further, the rule may include selecting, based on an index (or an ordering) associated with each respective DCI message, a last DCI message from the set of received DCI messages that includes a PDSCH group index field (such as included in DCI format 1_1), and the UE may set the last group, g, to the value of the group index field in the selected DCI. Based on the value of g, the UE may generate a HARQ-ACK codebook for the corresponding group, which may be included in a feedback message to a base station for the one or more groups.

The described techniques also provide for determining a total DAI value for a non-scheduled PDSCH group (e.g., a group that is different from the PDSCH group scheduled by a received DCI). Here, the UE may identify the last group using the rules described herein, and may then determine the total DAI value for another group (e.g., group (g+1)mod 2, the non-scheduled group) based on the identified group, g. Specifically, if the identified group from the rule is, for example, group 0, then the UE may utilize the total DAI value that is indicated by the selected DCI when generating a corresponding HARQ-ACK codebook. In other cases, if the group identified from the described rules is, for example, group 1, then the UE may set the total DAI for the non-scheduled group to a null or empty value (e.g., $V_{DAI}^{(g+1)mod\ 2}=\emptyset$). In any case, the UE may use the group index values determined in accordance with the above techniques for generating one or more HARQ-ACK codebooks included in a feedback message transmitted to the base station.

Aspects of the disclosure are initially described in the context of wireless communications systems. Aspects of the disclosure are then described with reference to various examples of feedback schemes. Aspects of the disclosure are further illustrated by and described with reference to apparatus diagrams, system diagrams, and flowcharts that relate to techniques for determining group identification and a DAI for enhanced dynamic codebooks.

FIG. 1 illustrates an example of a wireless communications system 100 that supports techniques for determining group identification and a DAI for enhanced dynamic codebooks in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell, for example, covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support techniques that enable a UE 115 to accurately generate feedback for one or more groups of downlink transmissions. For example, a wireless communications system may support codebook-based HARQ feedback (e.g., HARQ using an enhanced dynamic codebook). In such systems, a UE 115 may transmit, to a base station 105, a number of information bits within a HARQ-ACK codebook. As an example, the UE 115 may monitor for DCI during one or more monitoring occasions, where the control information may indicate one or more scheduled downlink transmissions (e.g., including data transmitted via a PDSCH) for the UE 115. The UE 115 may indicate whether each downlink transmission was successfully detected and received (e.g., decoded) using respective information bits (e.g., feedback bits such as an ACK bit or a NACK bit). In addition, different downlink transmissions may be associated with different groups (e.g., a first scheduled PDSCH may be associated with a first group, a second scheduled PDSCH may be associated with a second group, and so forth), and DCI may indicate which group a scheduled downlink transmission is associated with (e.g., the DCI may include a group index value in a group index field). The UE 115 may accordingly report feedback (e.g., one or more information bits in a first codebook) for downlink transmissions of the first group and feedback (e.g., one or more information bits in a second codebook) for downlink transmission of the second group. Further, the feedback for multiple downlink transmissions of one or more groups may be transmitted (e.g., via a PUCCH) during a same time period (e.g., during a same slot).

The UE 115 may utilize a rule for determining a group associated with one or more downlink transmissions. For instance, the UE 115 may receive one or more DCI messages scheduling the downlink transmissions for various groups, where the DCI messages may have the same or different formats (e.g., from a set of DCI formats). In some cases, the UE 115 may index the received DCI messages (e.g., in an ascending order) across serving cell indices and for a same monitoring occasion, and the UE 115 may further index (e.g., in an ascending order) the received DCI messages across monitoring occasion indices. Based on the indexing (or ordering) of the DCI messages, or based on an index associated with the one or more DCI messages, the UE 115 may select a last DCI message that includes a group index field. The group index field may provide the UE 115 with a group index value of a first group that is used for generating a codebook associated with the first group. The UE 115 may then transmit the feedback message that includes at least the codebook associated with downlink transmissions for the first group. In some aspects, the UE 115 may also identify a total DAI (tDAI) value for another group (e.g., tDAI') based on the identified group index. As an example, the UE 115 may identify a total DAI value for a non-scheduled group (e.g., a second group that is scheduled by another DCI message that is different from the selected DCI message) based on a value of the group index. Here, the UE 115 may utilize a total DAI value (e.g., tDAI') from the selected DCI message (e.g., a last DCI message that includes the group index field) or the UE 115 may use an empty value (e.g., Ø) for the total DAI value when generating a codebook for the second group sent within the feedback message.

Figure 2:
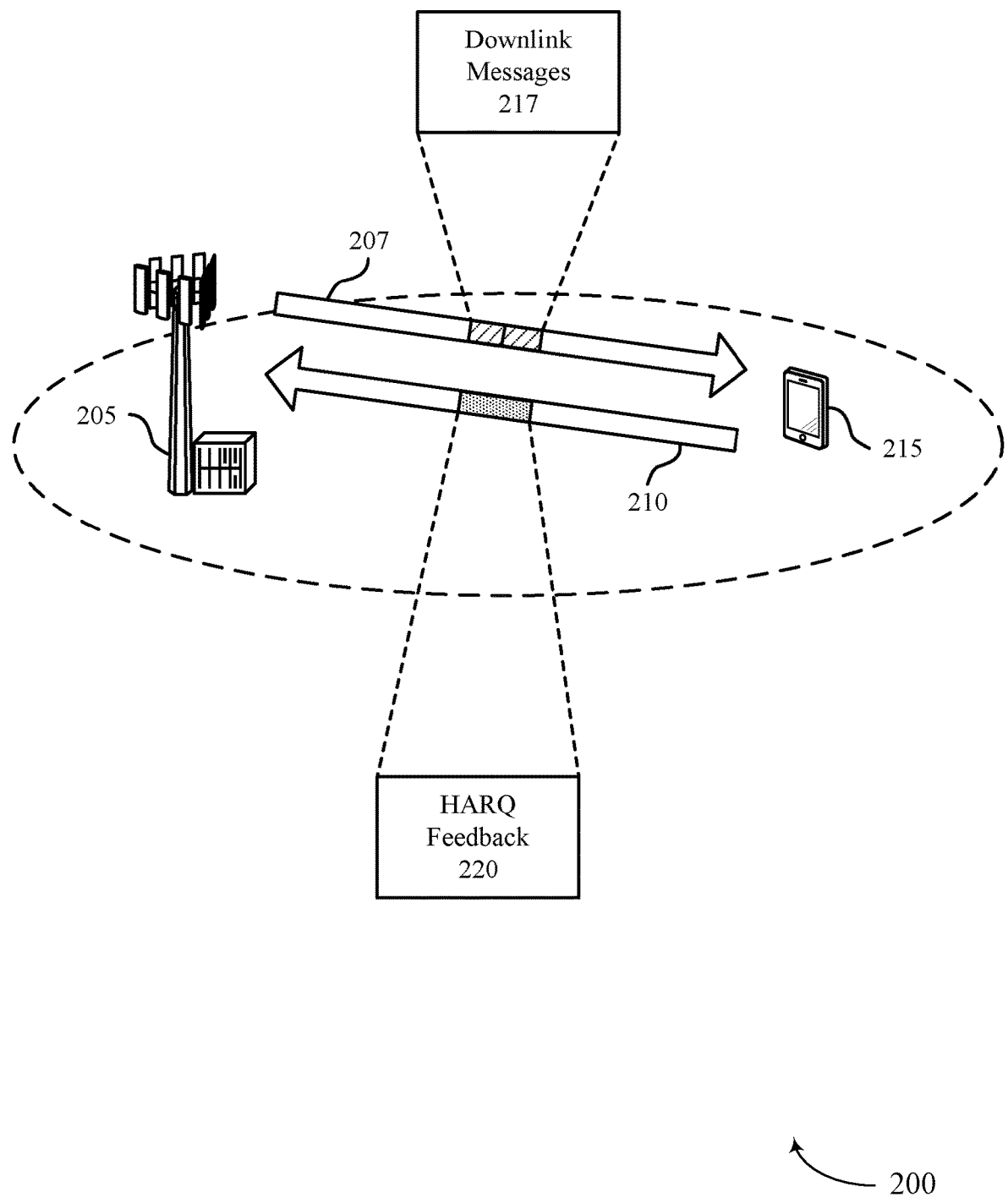
FIG. 2 illustrates an example of a wireless communications system that supports techniques for determining group identification and a DAI for enhanced dynamic codebooks in accordance with various aspects of the present disclosure.

FIG. 2 illustrates an example of a wireless communications system 200 that supports techniques for determining group identification and a DAI for enhanced dynamic codebooks in accordance with various aspects of the present disclosure. In some examples, wireless communications system 200 may implement aspects of wireless communications system 100. For example, the wireless communications system 200 includes a UE 215 and a base station 205, which may be examples of a UE 115 and base station 105, respectively, described with reference to FIG. 1. The wireless communications system 200 may implement various feedback schemes as described herein, which may enable one or more wireless devices (e.g., the UE 215) to more reliably and efficiently determine values for generating HARQ codebooks included in a feedback message, among other advantages.

In some cases, the UE 215 and the base station 205 may communicate using one or more downlink transmissions 207 and feedback transmissions 210. For example, the UE 215 may monitor for DCI during one or more monitoring occasions, where the control information may indicate one or more scheduled downlink transmissions 207 (e.g., including data transmitted via a PDSCH) for the UE 215. The DCI may include scheduling information corresponding to one or more data transmissions. The UE 215 may receive data transmitted by the base station 205 and may send feedback transmissions 210. In some cases, the downlink transmissions 207 may include one or more downlink messages 217 and feedback transmissions 210 may include HARQ feedback 220 (e.g., including one or more dynamic HARQ-ACK codebooks) corresponding to the one or more downlink messages 217.

According to some aspects, the UE 215 may transmit HARQ feedback to the base station 205. For example, the base station 205 may send data transmissions (e.g., downlink messages 217) on a PDSCH to the UE 215. The UE 215 may use HARQ feedback to ensure reception of the transmitted data. For example, the UE 215 may send HARQ feedback transmissions (e.g., HARQ feedback 220) that includes an ACK or a NACK for one or more of the data transmissions (e.g., one or more PDSCH transmissions). In such cases, the UE 215 may monitor for PDCCH during one or more monitoring occasions (e.g., time periods during which the UE 215 monitors a set of resources to identify data sent to the UE 215 from the base station 205).

In some cases, the wireless communications system 200 may use codebook-based HARQ feedback. For example, a HARQ-ACK codebook including multiple HARQ information bits (e.g., ACKs/NACKs for respective downlink messages 217) may be transmitted simultaneously on a single feedback occasion, where HARQ feedback bits may include a HARQ-ACK codebook.

In some cases, the UE 215 may transmit different types of HARQ-ACK codebooks. For instance, a semi-static codebook may be used, where a HARQ feedback bit may be reserved in a semi-static codebook of fixed size (e.g., regardless of whether a PDSCH transmission occurs). Additionally or alternatively, a dynamic codebook may be used. In such cases, a HARQ feedback bit may be conditionally added to a feedback message (i.e., a feedback transmission). For example, the HARQ feedback bit may be added or reserved in the dynamic codebook if a downlink message (such as a DCI message or a PDSCH transmission) is detected. Here, the UE 215 may construct a codebook for transmission based on a detection of a PDSCH transmission (e.g., where an information bit may only be included in a HARQ-ACK codebook if a transmission was detected). In some cases, the UE 215 may detect a PDSCH transmission by blind decoding of a PDCCH with a PDSCH allocation. In other cases, the UE 215 may detect a PDCCH releasing a semi-persistently scheduled PDSCH. In such cases, the PDCCH releasing the semi-persistently scheduled PDSCH may not involve the transmission of PDSCH, but the UE 215 may transmit an ACK to confirm detection of the PDCCH. In yet other cases, the UE 215 may detect a PDSCH transmission by detection of a semi-persistent PDSCH. In any event, such dynamic codebooks may reduce a codebook size and may reduce feedback overhead.

In some examples, the UE 215 may implement feedback for one or more groups of downlink transmissions (e.g., downlink messages 217). For example, different PDSCH transmissions may be configured (e.g., by the base station 205) to be included in different groups. The base station 205 may indicate (e.g., via downlink transmissions 207), to the UE 215, the configurations for each PDSCH transmission in the corresponding DCI message. As such, the UE 215 may indicate, using respective information bits within one or more codebooks, whether data transmissions corresponding to one or more groups of data transmissions were received or decoded successfully by the UE 215. In some examples, the UE 215 may generate a HARQ-ACK codebook corresponding to a first group of downlink messages 217 and a second group of downlink messages 217 (e.g., for CBG-based codebooks). Additionally or alternatively, the UE 215 may generate a HARQ-ACK codebook for each group (e.g., a first codebook for a first group and a second codebook for a second group).

However, in some examples, the procedures used by the UE 215 to determine the group associated with a downlink transmission may be ambiguous or based on a number of assumptions. For example, the UE 215 may receive a DCI message that does not include an indication of the group (e.g., a group index field) for the corresponding PDSCH (e.g., based on the format of the DCI message), and the UE 215 may make various assumptions when determining values for generating HARQ feedback related to the corresponding PDSCH. As an example, the UE 215 may receive a DCI message (e.g., a fallback DCI) which may not include a group index field for the PDSCH scheduled by the DCI. The UE 215 may accordingly report the corresponding HARQ feedback as part of a predetermined group (e.g., group 0).

As described in further detail below, in order to more accurately and efficiently generate HARQ feedback, the UE 215 may implement a rule for determining a group associated with one or more downlink transmissions. For example, the UE 215 may use a rule for determining a latest PDSCH group index value (e.g., corresponding to a parameter g) for which a codebook may be generated. The rule may include identifying a set of DCI messages that scheduled PDSCH reception for which HARQ feedback is to be transmitted in a same time interval (e.g., via PUCCH during a same slot). The UE 215 may index (e.g., in ascending order) the DCI messages. Based on the ordering of the DCI messages, an index associated with the DCI messages, or some combination thereof, the UE 215 may sequentially determine and select a last DCI message that includes a group index field. The UE 215 may set the value of g to the value of the group index field in the selected last DCI message. Further, the UE 215 may determine a total DAI value for a non-scheduled PDSCH group (e.g., tDAI') based on the identified group g. The UE 215 may use these determined values when generating the HARQ codebook for the associated group, and may transmit the feedback message including the HARQ codebook.

Figure 3:
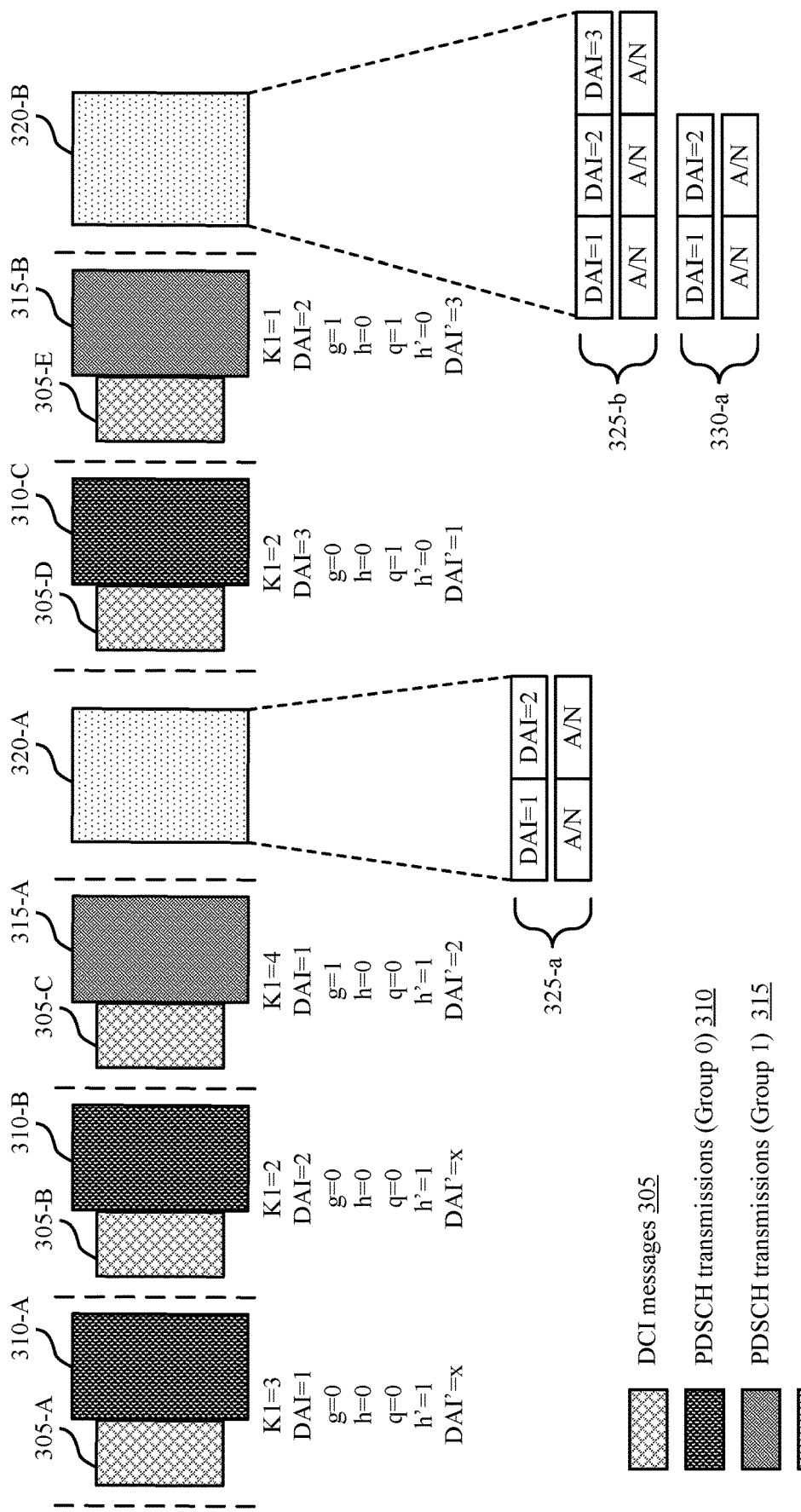
FIG. 3 illustrates an example of a feedback scheme that supports techniques for determining group identification and a DAI for enhanced dynamic codebooks in accordance with various aspects of the present disclosure.

FIG. 3 illustrates an example of a feedback scheme 300 that supports techniques for determining group identification and a DAI for enhanced dynamic codebooks in accordance with various aspects of the present disclosure. In some examples, feedback scheme 300 may implement aspects of wireless communications system 100 and wireless communications system 200. For instance, the feedback scheme 300 may illustrate communications between a UE and a base station, which may be examples of a UE 115 (or UE 215) and base station 105 (or base station 205), respectively, described with reference to FIGS. 1 and 2. The feedback scheme 300 may enable a wireless device to implement rules for determining values to use when generating HARQ codebooks.

The feedback scheme 300 may illustrate examples of DCI messages 305. For example, the DCI message 305-*a* may be an example of a transmission from a base station 105 to a UE during a first monitoring occasion (e.g., a slot). In some examples, the DCI message 305-*b* may be an example of a transmission during a second monitoring occasion, or an example of a transmission during the first monitoring occasion (e.g., one or more of the DCI messages 305 may be transmitted during a same PDCCH monitoring occasion, for example, across serving cells or on different component carriers (CCs)). The DCI messages 305 may indicate one or more data transmissions corresponding to a first group (e.g., PDSCH transmissions 310) or one or more data transmissions corresponding to a second group (e.g., PDSCH transmissions 315).

A UE may transmit first feedback 325 or second feedback 330 (e.g., information bits in one or more HARQ-ACK codebooks), or both, using a PUCCH transmission 320. As an example, the first feedback 325 and the second feedback 330 may be multiplexed and transmitted by the UE in the PUCCH transmission 320. The UE may determine the first feedback 325 or the second feedback 330 based on the DCI messages 305, the PDSCH transmissions 310 of the first group, and the PDSCH transmissions 315 of the second group, or any combination thereof. As an illustrative example, the UE may generate first feedback 325-*a* based on one or more of the DCI messages 305-*a* through 305-*b*, PDSCH transmissions 310-*a* and 310-*b*. For instance, the UE may receive one or more parameters in a DCI message 305. The one or more parameters may include an indication of the next opportunity for a PUCCH transmission 320. For example, the DCI message 305-*a* may include a parameter indicating a quantity of monitoring occasions (e.g., slots) between the DCI message 305-*a* and the PUCCH transmission 320-*a* (e.g., K1=3 may represent 3 slots between the DCI message 305-*a* and the PUCCH transmission 320-*a*).

Additionally or alternatively, the one or more parameters may include one or more DAIs. For example, the DCI message 305-*a* may correspond to a PDSCH transmission 310-*a* of a first group of PDSCH transmissions 310. The DCI message 305-*a* may include an indication of a DAI value associated with the scheduled group (e.g., the first group of PDSCH transmissions 310). For example, the PDSCH transmission 310-*a* may be a first transmission in the first group, and the DAI for the first group may be represented as, for example, DAI=1. In some examples, a DCI message 305 may include a DAI of a different group. For example, the DCI message 305-*c* may correspond to a PDSCH transmission 315-*a*, which may be a first transmission in a second group of PDSCH transmissions 315. In some cases, the feedback for the PDSCH transmission 315-*a* may be transmitted in the PUCCH transmission 320-*b* (e.g., based on the K value of DCI message 305-*c*). The DCI message 305-*c* may include an indication of the last transmitted value of the DAI of the non-scheduled group (e.g., first group of PDSCH transmissions 310). For example, the indication of the value of the DAI of the non-scheduled group may be represented by DAI' (e.g., DAI'=2 in the DCI message 305-*c*). Such an indication of the other group's most recent DAI value may enable a UE to properly construct feedback (e.g., first feedback 325-*a*, first feedback 325-*b*, second feedback 330) as described herein. The UE may receive a PDSCH transmission 310-*a* of the first group, and the DCI message 305-*c* may indicate a DAI value of 2 for the first group (e.g., DAI'=2). Thus, the UE may detect a missed DCI message 305-*b* based on the DCI message 305-*c*. The UE may generate the first feedback 325-*a* to include an entry for the missed DCI message 305-*b* (e.g., a NACK corresponding to DAI=2). Additionally or alternatively, the UE may generate the first feedback 325-*b* to include an entry for the missed DCI message 305-*b*. In some cases, the UE may be configured with multiple component carriers, and the DAI and DAI' values may be total DAI values (e.g., tDAI and tDAI') for the multiple component carriers.

Additionally or alternatively, the one or more parameters may include an indication that a DCI message 305 corresponds to a group. For example, the feedback scheme 300 may include examples of one or more indication fields that may, in some cases, be an example of a group index field corresponding to a parameter g that is used when generating feedback. The group index field may indicate a value of a group index (and a corresponding PDSCH group) for which a DCI message and/or PDSCH transmission is associated. In such cases, the parameter g may be set to the value provided by the group index field. For instance, a value of 0 in the group index field may indicate that the DCI message 305 corresponds to a PDSCH transmission 310 of the first group, and the UE may accordingly set g=0. In other examples, a value of 1 in the group index field may indicate that the DCI message 305 corresponds to a PDSCH transmission 315 of the second group, and the UE may accordingly set g=1. There may also be other examples of values provided by the group index field. In some examples, the one or more parameters may include a first NFI field corresponding to the first group (e.g., h=0 or h=1) or a second NFI field corresponding to the second group (e.g., h'=0 or h'=1), or both. For example, the first NFI field h may be toggled by the base station 105 (e.g., from a value of 0 to 1 or vice versa) to indicate to the UE to restart a counter for a DAI for the first group. Additionally or alternatively, the second NFI field h' may be toggled by the base station 105 (e.g., from a value of 0 to 1 or vice versa) to indicate to the UE to restart a counter for a DAI for the second group.

In some examples, the one or more parameters may include an indication for the UE to report (e.g., generate and transmit), in a same time period, first feedback 325, an indication for the UE to report both the first feedback 325 and second feedback 330, or both. For example, a HARQ-ACK information request field may correspond to a parameter q in the feedback scheme 300. As illustrated, if the base station 105 indicates a value of 0 (e.g., where q=0), the UE may generate and transmit the first feedback 325-*a* for the first group and refrain from transmitting second feedback 330 for the second group. Additionally or alternatively, if the base station 105 indicates a value of 1 (e.g., where q=1), the UE may generate and transmit both the first feedback 325 (e.g., the first feedback 325-*b*) for the first group and the second feedback 330 (e.g., the second feedback 330-*a*) for the second group in the same time period (e.g., in the same PUCCH transmission, such as a PUCCH transmission 320). In some examples, the various parameters described in the feedback scheme 300 may be present or absent from the DCI messages 305, for example, based on the format of the DCI or a configuration from the base station 105 (e.g., an RRC configuration).

A UE may identify first feedback 325 or second feedback 330 based on the various parameters and communications described herein. For example, the UE may transmit the first feedback 325-*a* associated with the first group of PDSCH transmissions 310 to the base station 105 via the PUCCH transmission 320-*a*. In some examples, the UE may refrain from indicating or generating second feedback 330 for reporting via the PUCCH transmissions 320-*a*, for example, due to an indication for the UE to report only the first feedback 325-*a* (e.g., represented as q=0 in the feedback scheme 300). In some examples, the first feedback 325-*a* may be indicated in a codebook. For example, the UE may determine information bits (e.g., feedback bits) for each PDSCH transmission 310. The information bits may indicate an ACK if a PDSCH transmission 310 was successfully decoded, and a NACK if a PDSCH transmissions 310 was not successfully received or decoded. For instance, the UE may successfully decode the PDSCH transmission 310-*a* and fail to receive the PDSCH transmission 310-*b* of the first group (e.g., the UE may miss the DCI message 305-*b*). In such an example, the UE may include an ACK for a first entry of the codebook (e.g., corresponding to a DAI of 1) and a NACK for a second entry of the codebook (e.g., corresponding to a DAI of 2), which may enable a base station 105 to retransmit the DCI message 305-*b*, the PDSCH transmission 310-*b*, or both.

As another illustrative example, the UE may identify the first feedback 325-*b* and the second feedback 330-*a* for a feedback report transmitted in a same time period. For example, the UE may include the first feedback 325-*b* and the second feedback 330-*a* in a same codebook for both groups, or generate a codebook for each of the first group and the second group. In some examples, the UE may transmit both the first feedback 325-*b* of the first group and the second feedback 330-*a* of the second group in the same time period (e.g., as part of a same PUCCH transmission 320) based on an indication from the base station 105 (e.g., represented as q=1 in the feedback scheme 300). In other examples, the first feedback 325-*b* of the first group and the second feedback 330-*a* of the second group may be included in a same feedback message (e.g., as part of a same PUCCH transmission 320) because a previous feedback message (e.g., sent via PUCCH transmission 320-*a*) was not received by the base station 105. Other scenarios may be possible that may result in both the first feedback 325-*b* of the first group and the second feedback 330-*a* of the second group being reported together in a same feedback message.

The UE may determine information bits to include in the first feedback 325-*a* and the second feedback 330-*a* as described herein. The UE may indicate the feedback report to the base station 105 via the PUCCH transmission 320-*b*. In some examples, the UE may report multiple information bits per PDSCH transmission.

In some examples, the UE may be unable to accurately determine values to use for generating the one or more codebooks for the feedback messages. For example, the UE may receive DCI messages 305 in various formats. Some formats (e.g., non-fallback DCI, such as DCI format 1_1) may include fields for a PDSCH group (e.g., group 0) that is scheduled by the DCI as well as fields for another (e.g., non-scheduled) PDSCH group (e.g., group 1). Other formats (e.g., fallback DCI, such as DCI format 1_0, or other non-fallback DCI formats, such as DCI format 1_2), however, may not include these fields, and the UE may make various assumptions when determining values for HARQ feedback related to the corresponding PDSCH. For example, the UE may receive a fallback DCI which may not include a group index field for the PDSCH scheduled by the DCI. As such, the UE may report the corresponding HARQ feedback as part of a predetermined group (e.g., group 0).

The UE may implement rules to more accurately and efficiently determine a group associated with one or more downlink transmissions. For example, the UE may use a rule for determining a latest PDSCH group g (e.g., a value g of a group index field) for which a codebook may be generated. The rule may include identifying a set of DCI messages (e.g., DCI messages 305) that schedule PDSCH transmissions (e.g., PDSCH transmissions 310) and that indicate a same slot (e.g., via PUCCH transmission 320) for the UE to transmit corresponding HARQ/ACK feedback, and for which the UE transmits corresponding HARQ-ACK information in the PUCCH. In some examples, the UE may index (e.g., in ascending order) the DCI messages 305 across serving cell indices for a same PDCCH monitoring occasion. That is, the detected DCI formats are first indexed in an ascending order across serving cell indexes for a same PDCCH monitoring occasion. In some cases, the UE may further index (e.g., in ascending order) the DCI messages 305 across PDCCH monitoring occasion indices.

The UE may identify a last DCI message 305 that includes a group index field based on an index associated with one or more of the DCI messages 305. For example, if the UE indexes and sequentially orders (e.g., based on the indexing) the DCI messages 305, the UE may identify the last DCI message 305 based on the indexing (or the ordering). The UE may set g to the value of a PDSCH group index field in a last DCI format that includes the group index field in the set of DCI formats. For example, the last DCI message in order may be a DCI message (e.g., DCI message 305-*b*) that includes a group index field, and the UE may identify a group index value from the group index field of the last DCI message. The UE may set the value of g equal to the group index value of that group index field (e.g., g=0) for the generation of the corresponding HARQ codebook. As another example, the last DCI message in order may be a fallback DCI message (or another DCI message without a group index field), and the UE may select the next DCI message (e.g., a DCI message with a group index field) as the last DCI message, for instance, based on the ordering of the DCI messages. The UE may set the value of g to the group index value identified from the group index field in the selected last DCI message.

In some cases, once the UE has determined (i.e., identified) the group index value g, the UE may determine other values using the parameters indicated in the last DCI message. For example, the UE may determine the value of the NFI (e.g., h=0 or h=1) for the first group g, the value of the HARQ-ACK information request field (e.g., q=0 or q=1), and the value of the NFI (e.g., h'=0 or h'=1) for the second group. The UE may use these determined values when generating the HARQ codebook for the associated group. That is, the first feedback 325 corresponding to the determined group g and the second feedback 330 corresponding to the second group may be determined based on the determined values. The UE may transmit the feedback message including the HARQ codebook.

In some cases, after determining the group index value g, the UE may utilize a rule to determine a total DAI value for another group (e.g., DAI' or tDAI'). That is, the UE may determine a total DAI value for a second group that is different from the first group g. For example, if the UE identifies that the group index value of the group index field of the last DCI message is equal to 0 (e.g., indicating that the last DCI message is associated with the first group), the UE may set DAI' to the same value indicated in the last DCI message.

However, in some cases, the value of DAI' indicated in the last DCI message may not be valid for use by the UE if there is a DCI message after (e.g., indexed after, received after, ordered after) the last DCI message. For instance, the UE may receive a second DCI message that has a DCI format that excludes the group index field, where the second DCI message is indexed after the last DCI message. As an example, there may be a fallback DCI message indexed after the identified last DCI message. Because the fallback DCI message may not include a group index field and/or a group index value, the UE may assume that the fallback DCI belongs to a predetermined group (e.g., group 0). If the selected last DCI message indicates a group index value for the second group (e.g., group 1) such that the UE sets the value of g equal to 1, then the DAI' value indicated in the selected last DCI message corresponds to the DAI value of the second group. However, this DAI' value may not be valid, because the fallback DCI message included in group 0 occurs after the selected last DCI message and, as such, may not be accounted for in the DAI' value indicated in the selected last DCI message. In this case, the UE may set the DAI' value to an empty value (e.g., 0) or a null value when generating a codebook for the second group. Put another way, if some predetermined group is indicated by the group index field (e.g., corresponding to g=1 when g is set by the UE) and a last DCI format in the set of DCI formats does not include a group index field, the UE may set $V_{DAI}^{(g+1)mod\,2}=\emptyset$.

Figure 4:
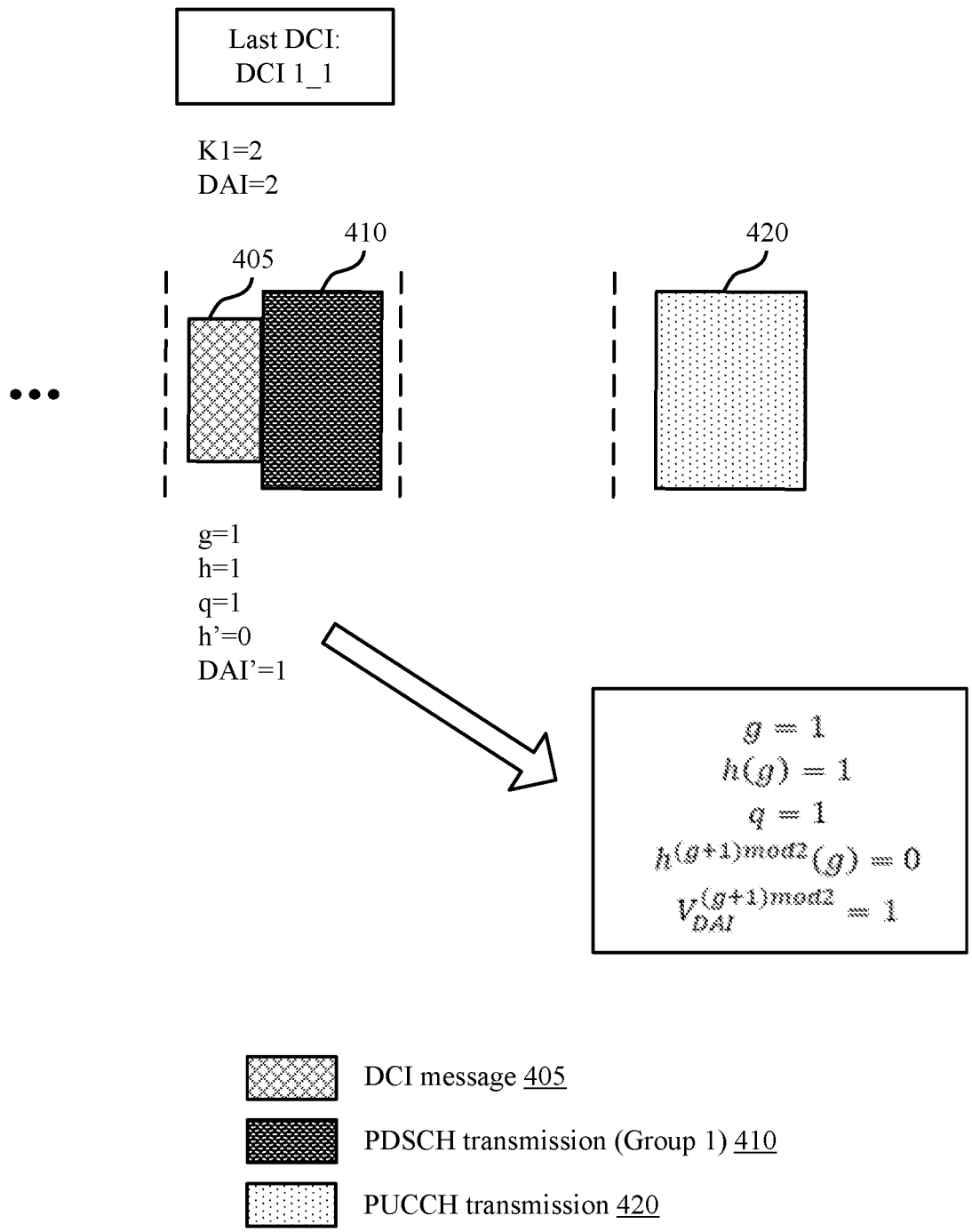
FIG. 4 illustrates an example of a feedback scheme that supports techniques for determining group identification and a DAI for enhanced dynamic codebooks in accordance with various aspects of the present disclosure.

FIG. 4 illustrates an example of a feedback scheme 400 that supports techniques for determining group identification and a DAI for enhanced dynamic codebooks in accordance with various aspects of the present disclosure. In some examples, feedback scheme 400 may implement aspects of wireless communications system 100 and wireless communications system 200. For instance, the feedback scheme 400 may illustrate communications between a UE 115 and a base station 105, which may be examples of a UE 115 or UE 215 and base station 105 or base station 205, respectively, described with reference to FIGS. 1 and 2. The feedback scheme 400 may enable a wireless device to implement a rule for determining values to use in generating HARQ codebooks.

In some examples, the feedback scheme 400 may implement aspects of the feedback scheme 300. For example, the feedback scheme 400 may include a DCI message 405, a PDSCH transmission 410, a PUCCH transmission 420, and one or more parameters of the DCI message 405, which may be examples of the corresponding communications and parameters as described with reference to FIG. 3. As illustrated, the parameters may include a group index g with a value of 1, indicating that the DCI message 405 corresponds to PDSCH transmission 410 belonging to a group 1. The parameters may further include an NFI value h=1, an information request field value q=1, an indication of the next PUCCH transmission opportunity K1=2, and a DAI value DAI=2. Additionally, the DCI message 405 may include parameters corresponding to a second group (e.g., group 0), such as h'=0 and DAI'=1.

The UE may apply one or more rules (e.g., as described with reference to FIG. 3) to determine the group associated with the PDSCH transmission 410. As an example, the UE may identify, based on an index associated with one or more received DCI messages, that DCI message 405 uses DCI format 1_1 and is the last (e.g., of an indexing, an ordering, a receive time) DCI message that includes a group index value g. Accordingly, the UE may determine the values to use when generating the HARQ codebook for the associated group based on those indicated in DCI message 405. For example, the UE may identify a group index value from the group index field of the DCI message 405. Thus, the UE may set g=1, h=1, and q=1. The UE may use the value of h' for a second group as $h^{(g+1)mod\,2}(g)=0$ and the value of DAI' for the second group $V_{DAI}^{(g+1)mod\,2}=1$. Here, although the group index value from the selected DCI message 405 indicates that g=1, the last DCI based on the indexing performed by the UE has a format that includes the PDSCH group index field, and the UE may utilize the DAI' value from the DCI message 405 (e.g., based on the format of the DCI message 405).

One or more HARQ-ACK codebooks may be generated based on the determined values for the associated groups, and the UE may transmit the codebooks within a feedback message transmitted in a same time period on the PUCCH transmission 420.

Figure 5:
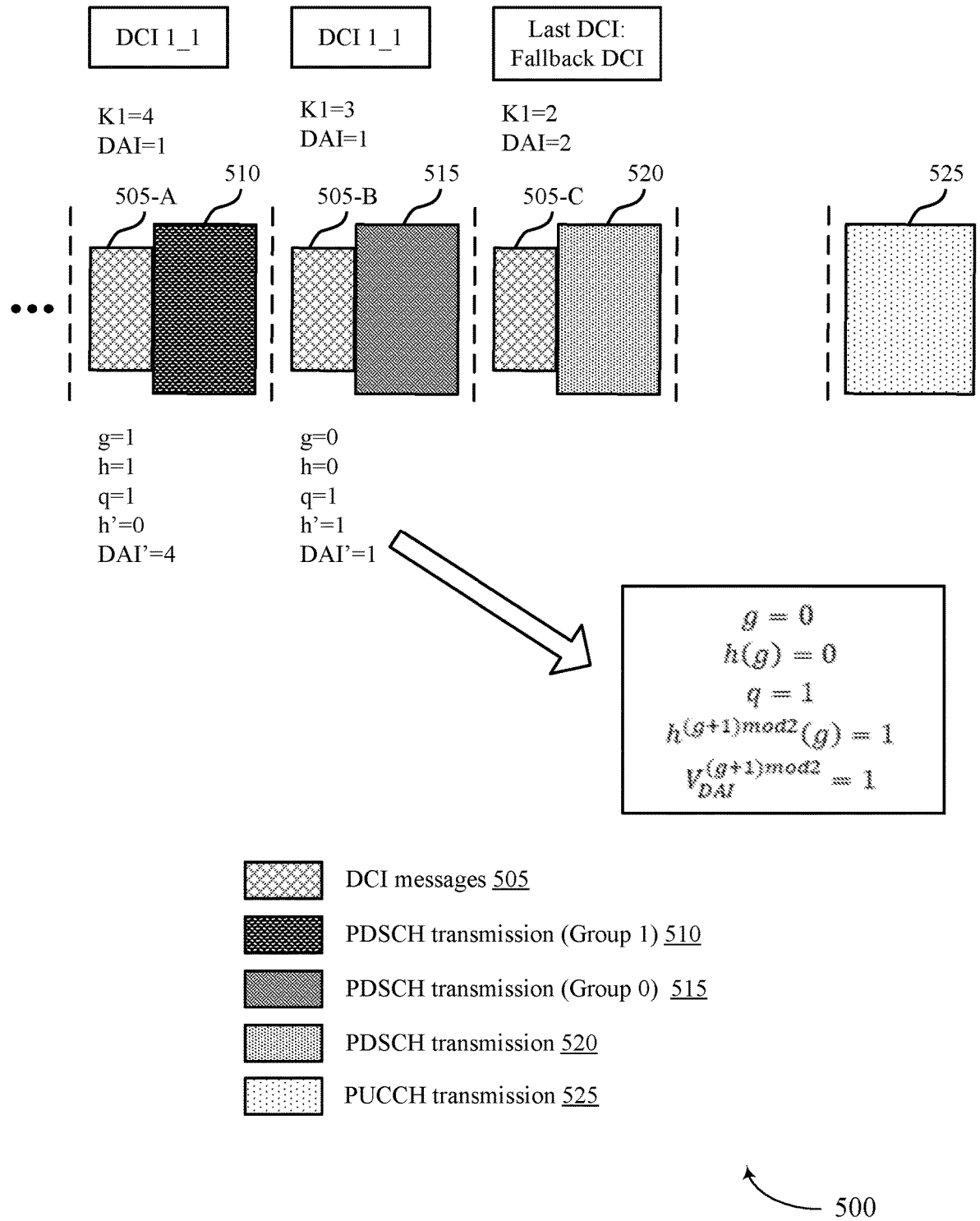
FIG. 5 illustrates an example of a feedback scheme that supports techniques for determining group identification and a DAI for enhanced dynamic codebooks in accordance with various aspects of the present disclosure.

FIG. 5 illustrates an example of a feedback scheme 500 that supports techniques for determining group identification and a DAI for enhanced dynamic codebooks in accordance with various aspects of the present disclosure. In some examples, feedback scheme 500 may implement aspects of wireless communications system 100 and wireless communications system 200. For instance, the feedback scheme 500 may illustrate communications between a UE 115 and a base station 105, which may be examples of a UE 115 or UE 215 and base station 105 or base station 205, respectively, described with reference to FIGS. 1 and 2. The feedback scheme 500 may enable a wireless device to implement rules for determining values for generating HARQ codebooks included in a feedback message.

In some examples, the feedback scheme 500 may implement aspects of the feedback scheme 300. For example, the feedback scheme 500 may include DCI messages 505, PDSCH transmissions 510, 515, and 520, a PUCCH transmission 520, and one or more parameters of the DCI messages 505, which may be examples of the corresponding communications and parameters as described with reference to FIG. 3. As indicated by a group index value of a group index field in DCI message 505-*a*, PDSCH transmission 510 may be associated with a group 1. Similarly, the group index value of the group index field in DCI message 505-*b* indicates that PDSCH transmission 515 may be associated with a group 0. However, DCI message 505-*c* may be a fallback DCI message (or may be a DCI message 505 that has a format that does not include a PDSCH group index field) and may exclude a group index field and/or a group index value, and PDSCH transmission 520 may be assumed to be associated with a predetermined group (e.g., group 0).

The UE may index the DCI messages 505 (e.g., as described with reference to FIG. 3) and may determine, based on an associated index, that the last DCI (e.g., DCI message 505-*c*) is a DCI message that excludes a group index field (e.g., has a format that excludes a group index field). Accordingly, the UE may select DCI message 505-*b* as the last DCI message that includes a group index field (e.g., has a format that includes a group index field). The UE may determine the group g associated with the PDSCH transmission 515, for example, by identifying the associated group index value indicated by the group index field.

Further, the UE may determine (e.g., set) the total DAI value for the other group based on determining the value of g. As an example, because the UE identified that g=0, the UE may utilize the DAI' value (e.g., the total DAI for group 1) from the DCI message 505-*b*. As such, the DAI value for group 1 set by the UE and used for generating the HARQ codebook may correspond to the DAI value included in the DCI message 505-*a*, and thus provide an accurately generated HARQ codebook for each PDSCH group.

Thus, one or more HARQ codebooks may be generated based on the determined values for the associated group, and the UE may transmit the codebooks within a feedback message on the PUCCH transmission 525.

Figure 6:
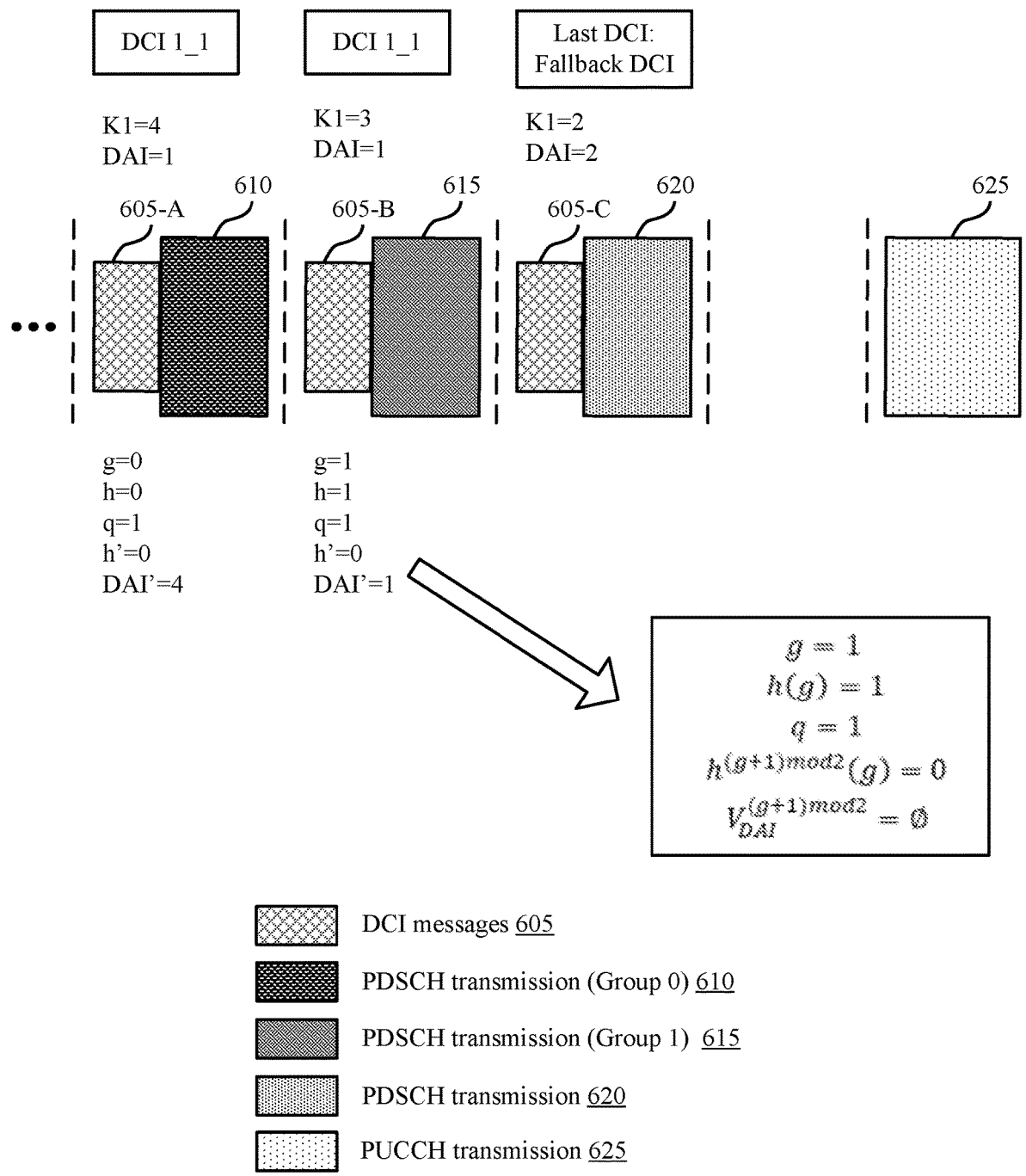
FIG. 6 illustrates an example of a feedback scheme that supports techniques for determining group identification and a DAI for enhanced dynamic codebooks in accordance with various aspects of the present disclosure.

FIG. 6 illustrates an example of a feedback scheme 600 that supports techniques for determining group identification and a DAI for enhanced dynamic codebooks in accordance with various aspects of the present disclosure. In some examples, feedback scheme 600 may implement aspects of wireless communications system 100 and wireless communications system 200. For instance, the feedback scheme 600 may illustrate communications between a UE 115 and a base station 105, which may be examples of a UE 115 or UE 215 and base station 105 or base station 205, respectively, described with reference to FIGS. 1 and 2. The feedback scheme 600 may enable a wireless device to implement rules for determining values for generating HARQ codebooks included in a feedback message.

In some examples, the feedback scheme 600 may implement aspects of the feedback scheme 300. For example, the feedback scheme 600 may include DCI messages 605, PDSCH transmissions 610, 615, and 620, PUCCH transmission 625, and one or more parameters of the DCI messages 605, which may be examples of the corresponding communications and parameters as described with reference to FIG. 3. As indicated by the group index field of DCI message 605-*a*, PDSCH transmission 610 may be associated with a group index value of 0. Similarly, the group index field of DCI message 605-*b* indicates that PDSCH transmission 615 may be associated with a group index value of 1. However, DCI message 605-*c* may be a fallback DCI message and may exclude a group index field and/or a group index value (e.g., may have a format that excludes a group index field), and PDSCH transmission 620 may be unassociated with a group.

To determine the group used by the UE to generate a HARQ-ACK codebook for the three PDSCH transmissions 610, 615, and 620, the UE may index the DCI messages 605 (e.g., as described with reference to FIG. 3) and may determine, based on an associated index, that the last DCI message (e.g., DCI message 605-*c*) is a DCI message that excludes a group index field (e.g., has a format that does not include a group index field). Accordingly, the UE may select DCI message 605-*b* as the last DCI message that includes a group index field (e.g., has a format that includes a group index field). The UE may determine the group for the HARQ-ACK codebook based on the group index value of the group index field of the selected DCI message (e.g., DCI message 605-*b*).

In this example, as the group index for the selected DCI message 605-*b* indicates that g=1, the UE may set the determined group index to g=1. However, the DAI' value for the second group (group 0) indicated in DCI message 605-*b* may be invalid for use by the UE, because the DAI' value may not account for DCI message 605-*c*. That is, because DCI message 605-*c* may not include a group index field, the UE may assume DCI message 605-*c* is included in group 0, but the DCI message 605-*c* occurs after the selected DCI message 605-*b* and the DAI' may not account for the total DAI for the group. As such, the UE may use a first value (e.g., an empty value, Ø, a null value, or the like) for the DAI' value when generating the corresponding codebook. More specifically, because the value of the group index field in the selected last DCI message 605-*b* indicates some predetermined group (e.g., a group such that the UE may set g=1 and as determined by the above rules), and the last DCI message 605-*c* has a format that excludes a PDSCH group index field (such as a fallback DCI format or another DCI format), the UE may set $V_{DAI}^{(g+1) mod\ 2}$=Ø for generating the feedback for the second group (group 0).

Thus, one or more HARQ codebooks may be generated based on the determined values for each group, and the UE may transmit the codebooks within a feedback message on the PUCCH transmission 625.

Figure 7:
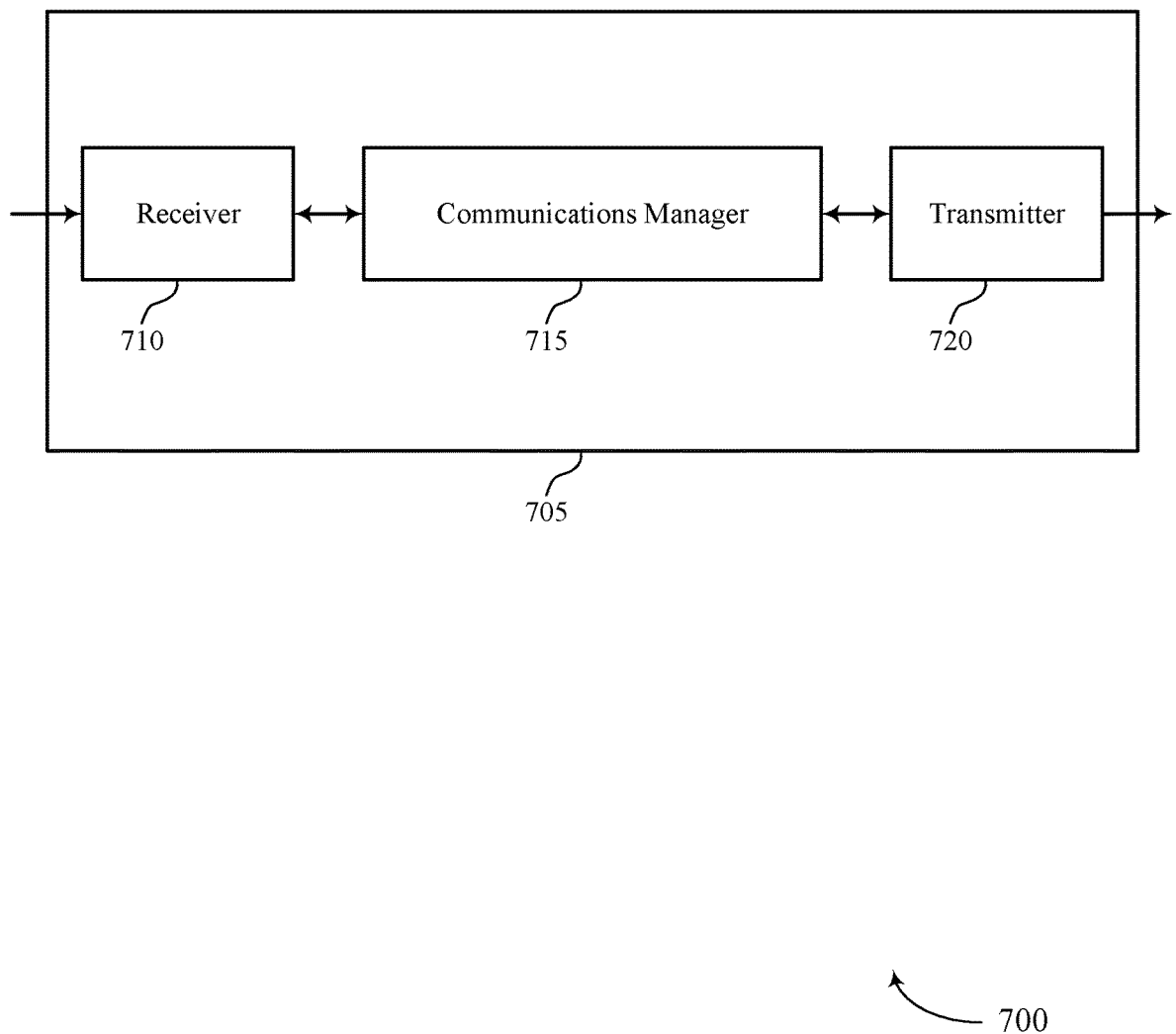
FIGS. 7 and 8 show block diagrams of devices that support techniques for determining group identification and a DAI for enhanced dynamic codebooks in accordance with various aspects of the present disclosure.

FIG. 7 shows a block diagram 700 of a device 705 that supports techniques for determining group identification and a DAI for enhanced dynamic codebooks in accordance with various aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for determining group identification and a DAI for enhanced dynamic codebooks, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive one or more DCI messages that schedule one or more groups of downlink transmissions, where a feedback message for the one or more downlink transmissions is to be transmitted during a same time period. The communications manager 715 may identify, based on an index associated with the one or more DCI messages, a first DCI message from the one or more DCI messages, the first DCI message including a group index field in accordance with a format of the first DCI message. In some examples, the communications manager 715 may index the received one or more DCI messages based on a set of serving cell indices (of a same PDCCH monitoring index) and a set of monitoring occasion indices (e.g., a set of PDCCH monitoring occasion indexes). The communications manager 715 may identify, from the group index field of the first DCI message, a group index value indicating a first group from the one or more groups of downlink transmissions based on the group index field of the first DCI message, and transmit, during the same time period, the feedback message for the one or more groups of downlink transmissions, the feedback message being based at least in part on the identified group index value. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages. One implementation may allow a UE to save power and increase battery life by avoiding having to perform complicated procedures for determining groups when providing HARQ feedback. Additionally or alternatively, the UE may more accurately and efficiently determine a group and associated parameters for providing feedback for multiple PDSCH groups.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
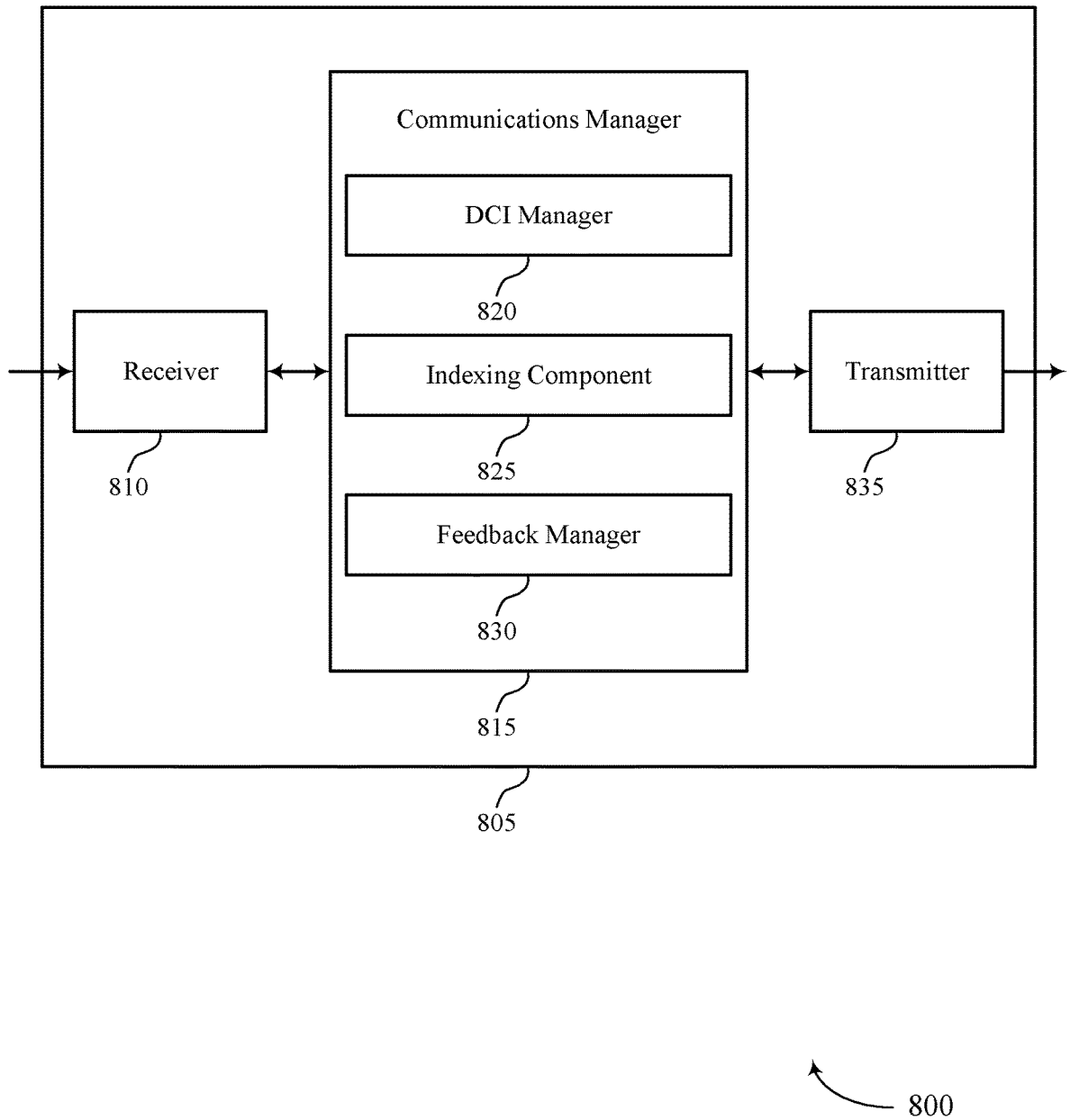

FIG. 8 shows a block diagram 800 of a device 805 that supports techniques for determining group identification and a DAI for enhanced dynamic codebooks in accordance with various aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to techniques for determining group identification and a DAI for enhanced dynamic codebooks, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a DCI manager 820, an indexing component 825, and a feedback manager 830. The communications manager 815 may be an example of aspects of the communications manager 1010 described herein.

The DCI manager 820 may receive one or more DCI messages that schedule one or more groups of downlink transmissions, where a feedback message for the one or more downlink transmissions is to be transmitted during a same time period. The DCI manager 820 may identify, based on an index associated with the one or more DCI messages, a first DCI message from the one or more DCI messages, the first DCI message including a group index field in accordance with a format of the first DCI message.

The indexing component 825 may index the received one or more DCI messages based on a set of serving cell indices and a set of monitoring occasion indices.

The feedback manager 830 may identify a group index value indicating a first group from the one or more groups of downlink transmissions based on the group index field of the first DCI message and transmit, during the same time period, the feedback message for the one or more groups of downlink transmissions, the feedback message being based on the identified group index value.

The transmitter 835 may transmit signals generated by other components of the device 805. In some examples, the transmitter 835 may be collocated with a receiver 810 in a transceiver component. For example, the transmitter 835 may be an example of aspects of the transceiver 1020 described with reference to FIG. 10. The transmitter 835 may utilize a single antenna or a set of antennas.

Based on the use of various rules for providing HARQ feedback using enhanced dynamic codebooks, a processor of a UE (e.g., controlling the receiver 810, the transmitter 835, or the transceiver 1020 as described with reference to FIG. 10) may efficiently determine a group index and other associated parameters when generating and transmitting feedback messages. As such, when a HARQ codebook is generated, the processor may more efficiently determine the bit values to include in a HARQ feedback report (as opposed to cases where HARQ processes may be complex or include some degree of ambiguity based on assumptions). These processes may accordingly improve HARQ processing, enabling efficient communications in a wireless system. More specifically, the improved HARQ processes may provide for higher reliability, which may further result in increased data rates, increased capacity, improved spectral efficiency, or the like.

Figure 9:
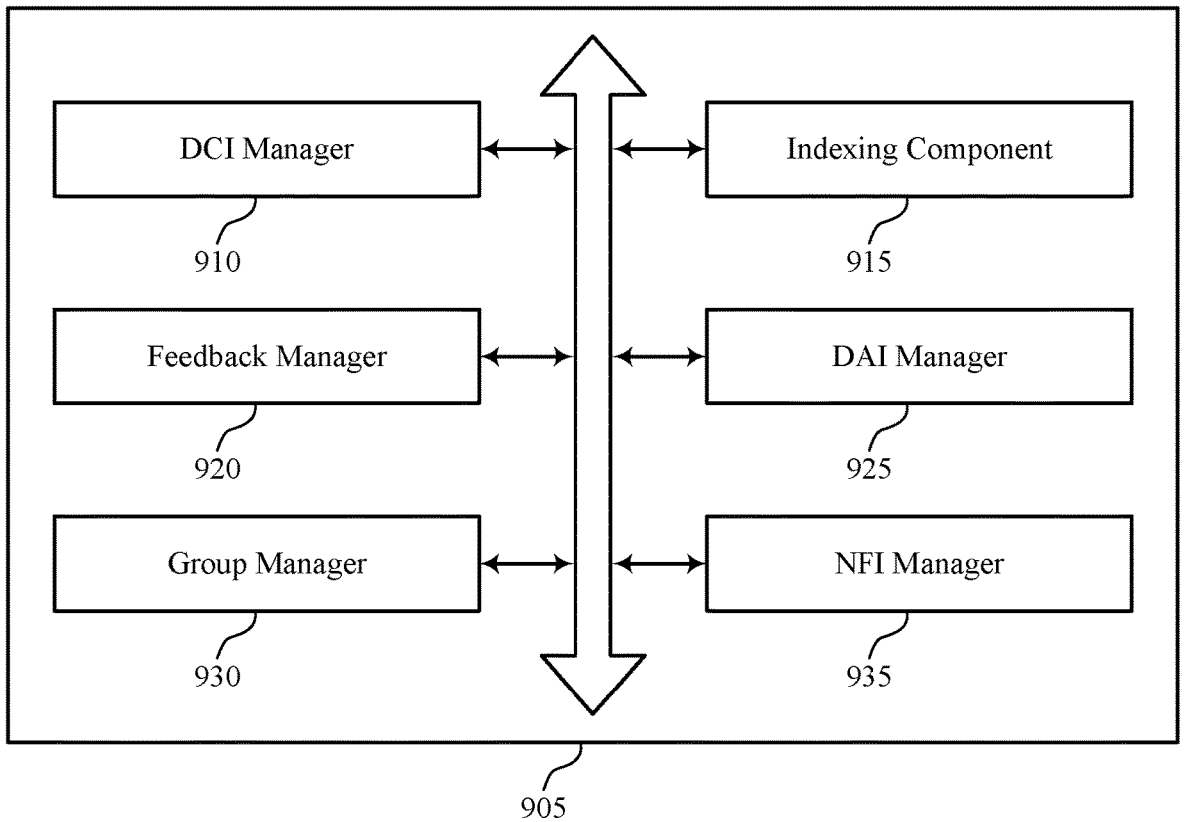
FIG. 9 shows a block diagram of a communications manager that supports techniques for determining group identification and a DAI for enhanced dynamic codebooks in accordance with various aspects of the present disclosure.

FIG. 9 shows a block diagram 900 of a communications manager 905 that supports techniques for determining group identification and a DAI for enhanced dynamic codebooks in accordance with various aspects of the present disclosure. The communications manager 905 may be an example of aspects of a communications manager 715, a communications manager 815, or a communications manager 1010 described herein. The communications manager 905 may include a DCI manager 910, an indexing component 915, a feedback manager 920, a DAI manager 925, a group manager 930, and an NFI manager 935. Each of these components may communicate, directly or indirectly, with one another (e.g., via one or more buses).

The DCI manager 910 may receive one or more DCI messages that schedule one or more groups of downlink transmissions, where a feedback message for the one or more downlink transmissions is to be transmitted during a same time period.

In some examples, the DCI manager 910 may identify, based on an index associated with the one or more DCI messages, a first DCI message from the one or more DCI messages, the first DCI message including a group index field in accordance with a format of the first DCI message.

In some examples, the DCI manager 910 may receive a second DCI message excluding the group index field in accordance with a format of the second DCI message, the second DCI message including a last DCI message.

In some examples, the DCI manager 910 may receive a second DCI message excluding the group index field in accordance with a format of the second DCI message, where the second DCI message is a last DCI message.

In some examples, the DCI manager 910 may receive a second DCI message excluding the group index field in accordance with a format of the second DCI message, where the first DCI message is selected based on the second DCI message excluding the group index field.

In some examples, the DCI manager 910 may receive a third DCI message including the group index field in accordance with a format of the third DCI message, where the first DCI message is selected based on the first DCI message being ordered after the third DCI message.

In some cases, the format of the second DCI message includes a fallback DCI format. In some cases, the format of the second DCI message includes a non-fallback DCI format that excludes the group index field. In some cases, each of the one or more DCI messages has a DCI format from a set of DCI formats. In some cases, the format of the first DCI message includes a non-fallback DCI format.

The indexing component 915 may index the received one or more DCI messages based on a set of serving cell indices and a set of monitoring occasion indices. In some examples, the indexing component 915 may index the received one or more DCI messages in an ascending first order across the set of serving cell indices for a same monitoring occasion. In some cases, the indexing component 915 may index, based on the ascending first order, the received one or more DCI messages in an ascending second order across the set of monitoring occasion indices.

In some examples, the indexing component 915 may determine, based on the indexing, that the first DCI message is a last DCI message including the group index field.

The feedback manager 920 may identify a group index value indicating a first group from the one or more groups of downlink transmissions based on the group index field of the first DCI message. In some examples, the feedback manager 920 may transmit, during the same time period, the feedback message for the one or more groups of downlink transmissions, the feedback message being based on the identified group index value.

In some examples, the feedback manager 920 may generate a second codebook for the second group using a value of a counter DAI of the second DCI message based on setting the total DAI value to a null value or am empty value, where the feedback message includes the second codebook.

In some examples, the feedback manager 920 may generate, based on one or more fields of the first DCI message, the first codebook for the first group and a second codebook for a second group that is different from the first group, where the feedback message includes the first codebook, the second codebook, or a combination thereof.

The DAI manager 925 may identify a total DAI value for a second group that is different from the first group based on the identified group index value from the first DCI message, where the feedback message is based on the identified total DAI value for the second group.

In some examples, the DAI manager 925 may identify the total DAI value from the first DCI message based on the determination. In some examples, the DAI manager 925 may identify the total DAI value from the first DCI message based on the second DCI message excluding the group index field. In some examples, the DAI manager 925 may identify the total DAI value from the first DCI message based on a format of the first DCI message.

In some examples, the DAI manager 925 may set the total DAI value for the second group to a first value based on the determination. In some cases, the first value includes a null value or an empty value. The group manager 930 may determine that the first group includes a first predetermined group based on the identified group index. In some examples, determining that the first group includes a second predetermined group based on the identified group index.

The NFI manager 935 may identify, from the first DCI message, a value of a first NFI field for the first group, a number of requested groups, a value of a second NFI field for a second group that is different from the first group, or a combination thereof.

Figure 10:
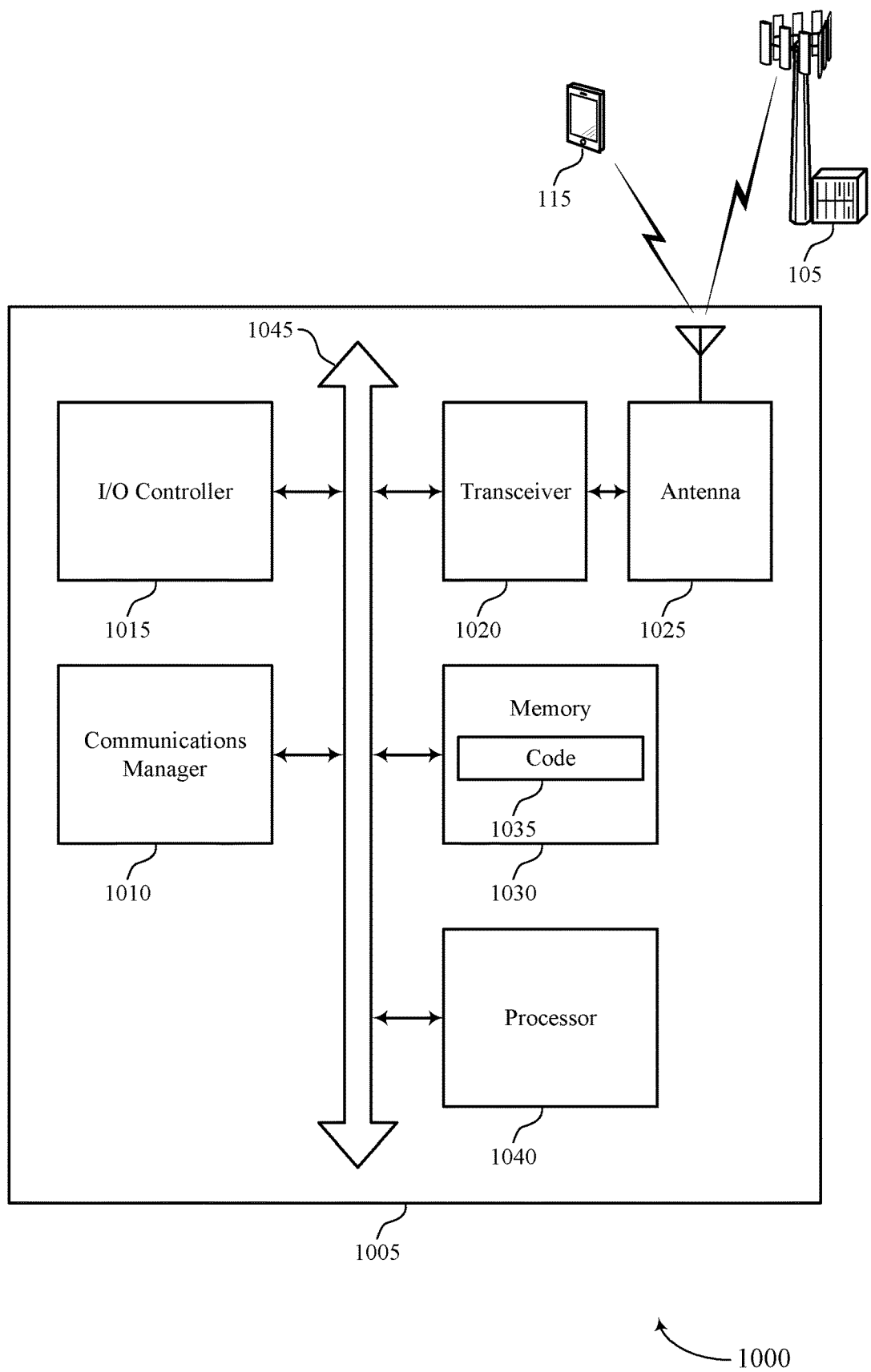
FIG. 10 shows a diagram of a system including a device that supports techniques for determining group identification and a DAI for enhanced dynamic codebooks in accordance with various aspects of the present disclosure.

FIG. 10 shows a diagram of a system 1000 including a device 1005 that supports techniques for determining group identification and a DAI for enhanced dynamic codebooks in accordance with various aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive one or more DCI messages that schedule one or more groups of downlink transmissions, where a feedback message for the one or more downlink transmissions is to be transmitted during a same time period, identify, based on an index associated with the one or more DCI messages, a first DCI message from the one or more DCI messages, the first DCI message including a group index field in accordance with a format of the first DCI message, identify a group index value indicating a first group from the one or more groups of downlink transmissions based on the group index field of the first DCI message, and transmit, during the same time period, the feedback message for the one or more groups of downlink transmissions, the feedback message being based on the identified group index.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for determining group identification and a DAI for enhanced dynamic codebooks).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
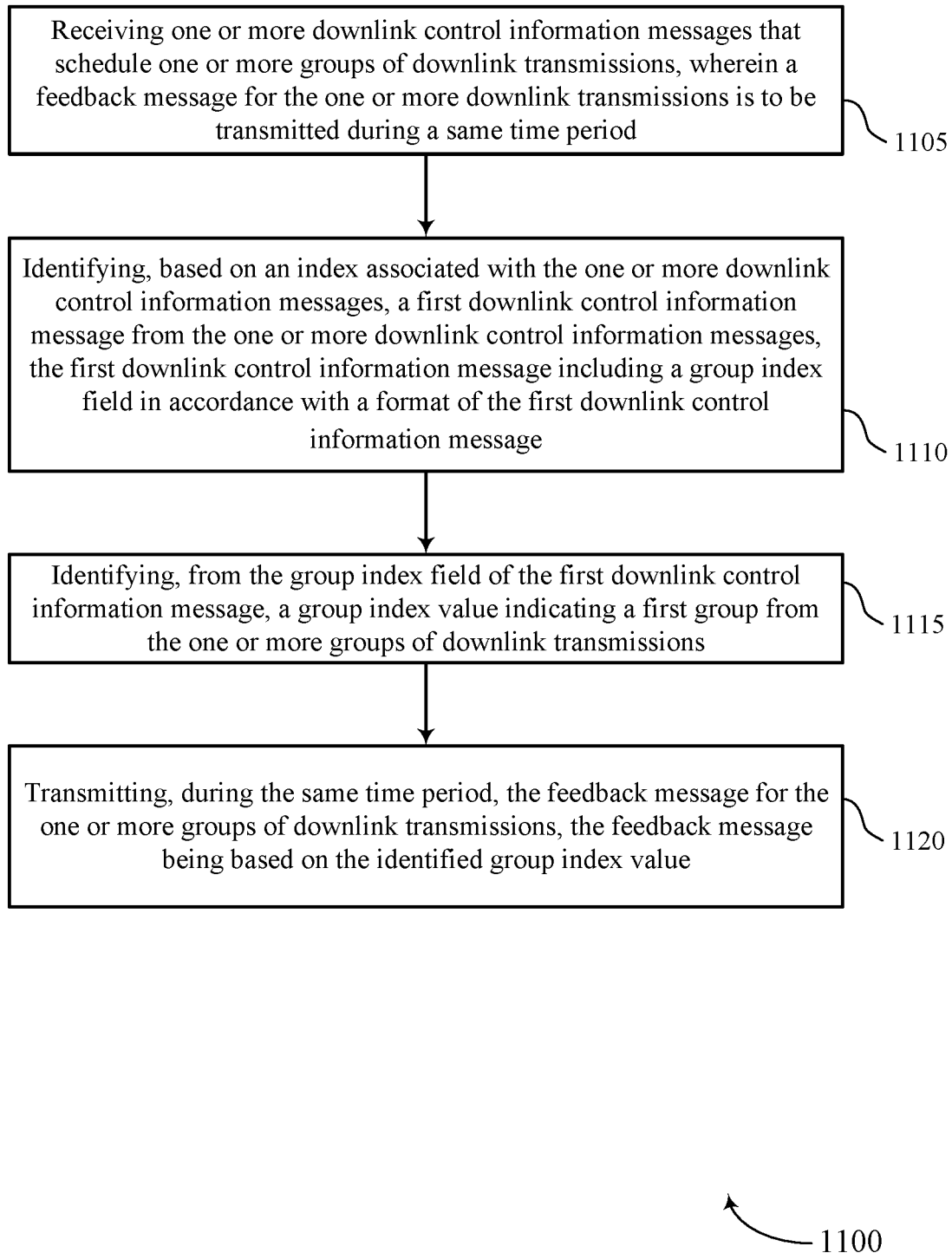
FIGS. 11 and 12 show flowcharts illustrating methods that support techniques for determining group identification and a DAI for enhanced dynamic codebooks in accordance with various aspects of the present disclosure.

FIG. 11 shows a flowchart illustrating a method 1100 that supports techniques for determining group identification and a DAI for enhanced dynamic codebooks in accordance with various aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1105, the UE may receive one or more DCI messages that schedule one or more groups of downlink transmissions, where a feedback message for the one or more downlink transmissions is to be transmitted during a same time period. The operations of 1105 may be performed according to the methods described herein. In some examples, aspects of the operations of 1105 may be performed by a DCI manager as described with reference to FIGS. 7 through 10.

At 1110, the UE may identify, based on an index associated with the one or more DCI messages, a first DCI message from the one or more DCI messages, the first DCI message including a group index field in accordance with a format of the first DCI message. The operations of 1110 may be performed according to the methods described herein. In some examples, aspects of the operations of 1110 may be performed by a DCI manager as described with reference to FIGS. 7 through 10.

At 1115, the UE may identify, based on the group index field of the first DCI message, a group index value indicating a first group from the one or more groups of downlink transmissions. The operations of 1115 may be performed according to the methods described herein. In some examples, aspects of the operations of 1115 may be performed by a feedback manager as described with reference to FIGS. 7 through 10.

At 1120, the UE may transmit, during the same time period, the feedback message for the one or more groups of downlink transmissions, the feedback message being based on the identified group index value. The operations of 1120 may be performed according to the methods described herein. In some examples, aspects of the operations of 1120 may be performed by a feedback manager as described with reference to FIGS. 7 through 10.

Figure 12:
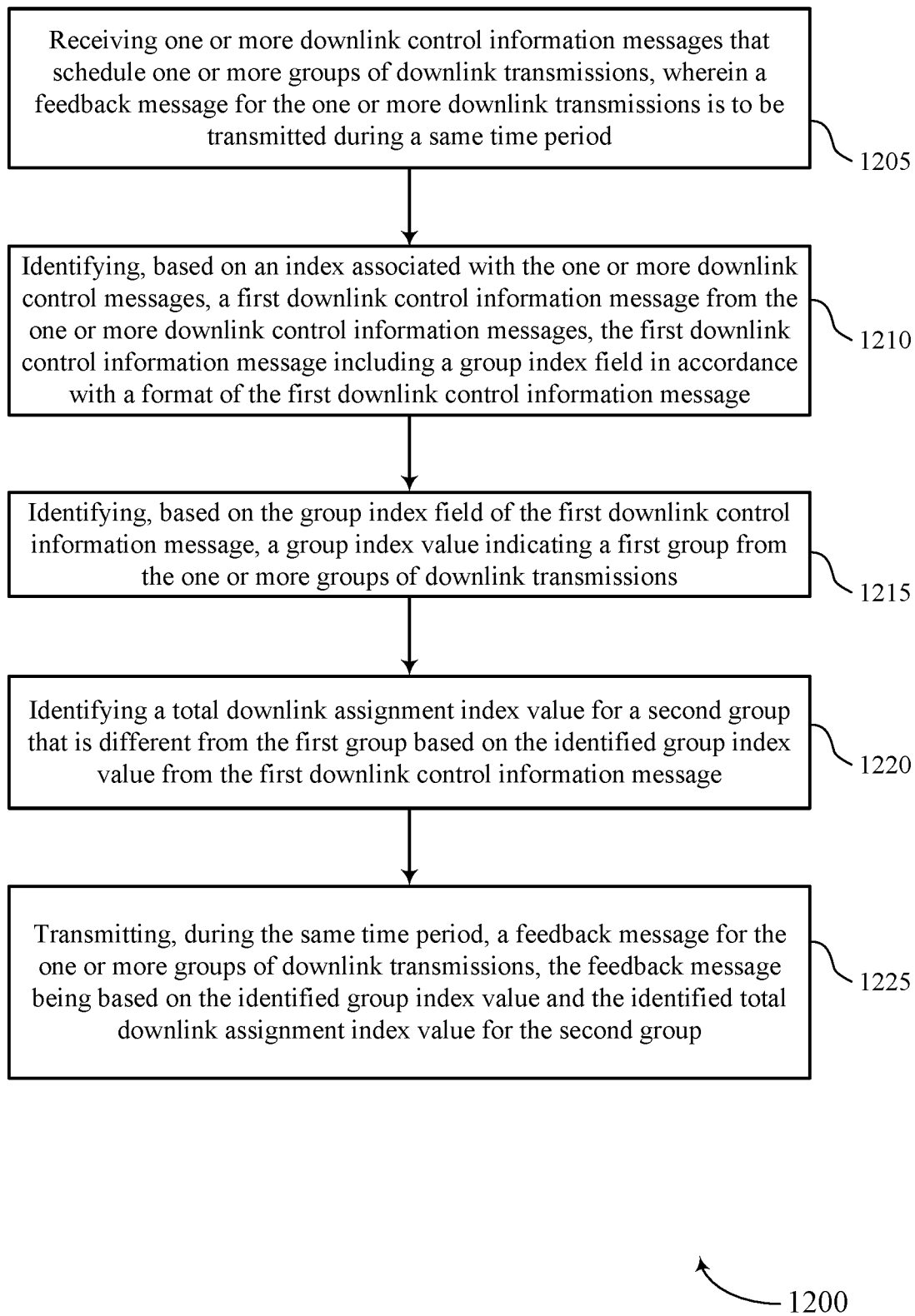

FIG. 12 shows a flowchart illustrating a method 1200 that supports techniques for determining group identification and a DAI for enhanced dynamic codebooks in accordance with various aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1205, the UE may receive one or more DCI messages that schedule one or more groups of downlink transmissions, where a feedback message for the one or more downlink transmissions is to be transmitted during a same time period. The operations of 1205 may be performed according to the methods described herein. In some examples, aspects of the operations of 1205 may be performed by a DCI manager as described with reference to FIGS. 7 through 10.

At 1210, the UE may identify, based on an index associated with the one or more DCI messages, a first DCI message from the one or more DCI messages, the first DCI message including a group index field in accordance with a format of the first DCI message. The operations of 1210 may be performed according to the methods described herein. In some examples, aspects of the operations of 1210 may be performed by a DCI manager as described with reference to FIGS. 7 through 10.

At 1215, the UE may identify, based on the group index field of the first DCI message, a group index value indicating a first group from the one or more groups of downlink transmissions. The operations of 1215 may be performed according to the methods described herein. In some examples, aspects of the operations of 1215 may be performed by a feedback manager as described with reference to FIGS. 7 through 10.

At 1220, the UE may identify a total DAI value for a second group that is different from the first group based on the identified group index value from the first DCI message, where the feedback message is based on the identified total DAI value for the second group. The operations of 1220 may be performed according to the methods described herein. In some examples, aspects of the operations of 1220 may be performed by a DAI manager as described with reference to FIGS. 7 through 10.

At 1225, the UE may transmit, during the same time period, the feedback message for the one or more groups of downlink transmissions, the feedback message being based on the identified group index value and the identified total downlink assignment index value for the second group. The operations of 1225 may be performed according to the methods described herein. In some examples, aspects of the operations of 1225 may be performed by a feedback manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: receiving one or more downlink control information messages that schedule one or more groups of downlink transmissions, wherein a feedback message for the one or more downlink transmissions is to be transmitted during a same time period; identifying, based at least in part on an index associated with the one or more downlink control information messages, a first downlink control information message from the one or more downlink control information messages, the first downlink control information message including a group index field in accordance with a format of the first downlink control information message; identifying, from the group index field of the first downlink control information message, a group index value indicating a first group from the one or more groups of downlink transmissions; and transmitting, during the same time period, the feedback message for the one or more groups of downlink transmissions, the feedback message being based at least in part on the identified group index value.

Aspect 2: The method of aspect 1, further comprising: identifying a total downlink assignment index value for a second group that is different from the first group based at least in part on the identified group index value from the first downlink control information message, wherein the feedback message is based at least in part on the identified total downlink assignment index value for the second group.

Aspect 3: The method of aspect 2, wherein identifying the total downlink assignment index value for the second group comprises: determining that the first group comprises a first predetermined group based at least in part on the identified group index value; receiving a second downlink control information message excluding the group index field in accordance with a format of the second downlink control information message, wherein the second downlink control information message is after the first downlink control information message; and setting the total downlink assignment index value for the second group to a first value based at least in part on the determination.

Aspect 4: The method of aspect 3, wherein the first value comprises a null value or an empty value.

Aspect 5: The method of aspect 4, further comprising: generating a second codebook for the second group using a value of a counter downlink assignment index of the second downlink control information message based at least in part on setting the total downlink assignment index value to the null value or the empty value, wherein the feedback message comprises the second codebook.

Aspect 6: The method of aspect 2, wherein identifying the total downlink assignment index value for the second group comprises: determining that the first group comprises a second predetermined group based at least in part on the identified group index value; and identifying the total downlink assignment index value from the first downlink control information message based at least in part on the determination.

Aspect 7: The method of aspect 2, wherein identifying the total downlink assignment index value for the second group comprises: receiving a second downlink control information message excluding the group index field in accordance with a format of the second downlink control information message, wherein the second downlink control information is after the first downlink control information message; and identifying the total downlink assignment index value from the first downlink control information message based at least in part on the second downlink control information message excluding the group index field.

Aspect 8: The method of aspect 2, wherein identifying the total downlink assignment index value for the second group comprises: identifying the total downlink assignment index value from the first downlink control information message based at least in part on a format of the first downlink control information message.

Aspect 9: The method of any of aspects 1 through 8, further comprising: indexing the received one or more downlink control information messages in an ascending first order across the set of serving cell indices for a same monitoring occasion; and indexing, based at least in part on the ascending first order, the received one or more downlink control information messages in an ascending second order across the set of monitoring occasion indices.

Aspect 10: The method of any of aspects 1 through 9, wherein receiving the one or more downlink control information messages comprises: receiving a second downlink control information message excluding the group index field in accordance with a format of the second downlink control information message, wherein the first downlink control information message is selected based at least in part on the second downlink control information message excluding the group index field.

Aspect 11: The method of aspect 10, wherein the format of the second downlink control information message comprises a fallback downlink control information format.

Aspect 12: The method of any of aspects 10 through 11, wherein the format of the second downlink control information message comprises a non-fallback downlink control information format that excludes the group index field.

Aspect 13: The method of any of aspects 1 through 12, wherein receiving the one or more downlink control information messages comprises: receiving a third downlink control information message including the group index field in accordance with a format of the third downlink control information message, wherein the first downlink control information message is selected based at least in part on the first downlink control information message being ordered after the third downlink control information message.

Aspect 14: The method of any of aspects 1 through 13, further comprising: determining, based at least in part on the indexing, that the first downlink control information message is a last downlink control information message including the group index field.

Aspect 15: The method of any of aspects 1 through 14, further comprising: identifying, from the first downlink control information message, a value of a first new feedback indication field for the first group, a number of requested groups, a value of a second new feedback indication field for a second group that is different from the first group, or a combination thereof.

Aspect 16: The method of any of aspects 1 through 15, further comprising: generating, based at least in part on one or more fields of the first downlink control information message, the first codebook for the first group and a second codebook for a second group that is different from the first group, wherein the feedback message includes the first codebook, the second codebook, or a combination thereof.

Aspect 17: The method of any of aspects 1 through 16, wherein each of the one or more downlink control information messages has a downlink control information format from a set of downlink control information formats.

Aspect 18: The method of any of aspects 1 through 17, wherein the format of the first downlink control information message comprises a non-fallback downlink control information format.

Aspect 19: An apparatus for wireless communication, comprising a processor; memory coupled with the processor; and instructions stored in the memory and executable by the processor to cause the apparatus to perform a method of any of aspects 1 through 18.

Aspect 20: An apparatus for wireless communication, comprising at least one means for performing a method of any of aspects 1 through 18.

Aspect 21: A non-transitory computer-readable medium storing code for wireless communication, the code comprising instructions executable by a processor to perform a method of any of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a set of downlink control information messages scheduling one or more groups of downlink transmissions, the set of downlink control information messages including at least a first downlink control information message and a second downlink control information message, wherein the first downlink control information message comprises a first format that includes a group index field, and wherein the second downlink control information message comprises a second format that excludes the group index field; and
transmitting a feedback message for at least a first group of the one or more groups, the feedback message comprising a codebook including feedback information for at least the first group in accordance with a value indicated by the group index field of the first downlink control information message, wherein the value indicated by the group index field of the first downlink control information message is used for the codebook based at least in part on the first downlink control information message comprising a last downlink control information message having the first format that includes the group index field.

2. The method of claim 1, further comprising:
setting a downlink assignment index value for a second group of the one or more groups that is different from the first group, wherein the downlink assignment index value for the second group is indicated by a field of the first downlink control information message in accordance with the first downlink control information message comprising the last downlink control information message having the first format that includes the group index field, and wherein the codebook is based at least in part on the downlink assignment index value for the second group.

3. The method of claim 1, wherein the second downlink control information message is received after the first downlink control information message, the method further comprising:
setting a downlink assignment index value for a second group of the one or more groups different from the first group, wherein the downlink assignment index value for the second group is set to a predetermined value based at least in part on the group index field indicating the first group, and wherein the codebook includes feedback information for the second group based at least in part on the downlink assignment index value for the second group.

4. The method of claim 3, wherein the predetermined value comprises a null value or an empty value.

5. The method of claim 1, wherein the second downlink control information message is received after the first downlink control information message, the method further comprising:
setting a downlink assignment index value for a second group of the one or more groups that is different from the first group, wherein the downlink assignment index value for the second group is indicated by a field of the first downlink control information message based at least in part on the second downlink control information message comprising the second format that excludes the group index field.

6. The method of claim 1, wherein the value indicated by the group index field comprises a first value, the method further comprising:
multiplexing the feedback information for the first group and feedback information for a second group of the one or more groups in the feedback message, wherein the multiplexing is based at least in part on the first value and a number of requested groups indicated by a field of the first downlink control information message, and wherein the second group is different than the first group.

7. The method of claim 1, further comprising:
identifying respective values of one or more of a first new feedback indicator field or a second new feedback indicator field included in the first downlink control information message, wherein the codebook includes the feedback information for the at least one group based at least in part on the respective values.

8. The method of claim 1, further comprising:
indexing each downlink control information message of the set of downlink control information messages in an ascending first order across a set of serving cell indices for a same monitoring occasion; and
indexing, based at least in part on the ascending first order, each downlink control information message of the set of downlink control information messages in an ascending second order across a set of monitoring occasion indices.

9. The method of claim 1, wherein receiving the set of downlink control information messages comprises:
receiving a third downlink control information message of the set of downlink control information messages, wherein the third downlink control information message comprises the first format that includes the group index field, and wherein the first downlink control information message is identified as the last downlink control information message of the set of downlink control information messages based at least in part on the first downlink control information message corresponding to a first monitoring occasion that is after a second monitoring occasion corresponding to the third downlink control information message.

10. The method of claim 1, further comprising:
determining that the first downlink control information message comprises the last downlink control information message having the first format that includes the group index field based at least in part on an index associated with a monitoring occasion corresponding to the first downlink control information message.

11. The method of claim 1, wherein the first format comprises downlink control information format 1_1.

12. The method of claim 1, the second format comprises downlink control information format 1_0.

13. An apparatus for wireless communication, comprising:
one or more memories storing processor-executable code; and
one or more processors coupled with the one or more memories and operable to execute the code to cause the apparatus to:
receive a set of downlink control information messages scheduling one or more groups of downlink transmissions, the set of downlink control information messages including at least a first downlink control information message and a second downlink control information message, wherein the first downlink control information message comprises a first format that includes a group index field, and wherein the second downlink control information message comprises a second format that excludes the group index field; and
transmit a feedback message for at least a first group of the one or more groups, the feedback message comprising a codebook including feedback information for at least the first group in accordance with a value indicated by the group index field of the first downlink control information message, wherein the value indicated by the group index field of the first downlink control information message is used for the codebook based at least in part on the first downlink control information message comprising a last downlink control information message having the first format that includes the group index field.

14. The apparatus of claim 13, wherein the one or more processors are individually or collectively further operable to execute the code to cause the apparatus to:
set a downlink assignment index value for a second group of the one or more groups that is different from the first group, wherein the downlink assignment index value for the second group is indicated by a field of the first downlink control information message in accordance with the first downlink control information message comprising the last downlink control information message having the first format that includes the group index field, and wherein the codebook is based at least in part on the downlink assignment index value for the second group.

15. The apparatus of claim 13, wherein the second downlink control information message is received after the first downlink control information message, and the one or more processors are individually or collectively further operable to execute the code to cause the apparatus to:
set a downlink assignment index value for a second group of the one or more groups different from the first group, wherein the downlink assignment index value for the second group is set to a predetermined value based at least in part on the group index field indicating the first group, and wherein the codebook includes feedback information for the second group based at least in part on the downlink assignment index value for the second group.

16. The apparatus of claim 15, wherein the predetermined value comprises a null value or an empty value.

17. The apparatus of claim 13, wherein the second downlink control information message is received after the first downlink control information message, and the one or more processors are individually or collectively further operable to execute the code to cause the apparatus to:
set a downlink assignment index value for a second group of the one or more groups that is different from the first group, wherein the downlink assignment index value for the second group is indicated by a field of the first downlink control information message based at least in part on the second downlink control information message comprising the second format that excludes the group index field.

18. The apparatus of claim 13, wherein the value indicated by the group index field comprises a first value, and the one or more processors are individually or collectively further operable to execute the code to cause the apparatus to:
multiplex the feedback information for the first group and feedback information for a second group of the one or more groups in the feedback message, wherein the multiplexing is based at least in part on the first value and a number of requested groups indicated by a field of the first downlink control information message, and wherein the second group is different than the first group.

19. The apparatus of claim 13, wherein the one or more processors are individually or collectively further operable to execute the code to cause the apparatus to:
identify respective values of one or more of a first new feedback indicator field or a second new feedback indicator field included in the first downlink control information message, wherein the codebook includes the feedback information for the at least one group based at least in part on the respective values.

20. The apparatus of claim 13, wherein the one or more processors are individually or collectively further operable to execute the code to cause the apparatus to:
index each downlink control information message of the set of downlink control information messages in an ascending first order across a set of serving cell indices for a same monitoring occasion; and
indexing, based at least in part on the ascending first order, each downlink control information message of the set of downlink control information messages in an ascending second order across a set of monitoring occasion indices.

21. The apparatus of claim 13, wherein, to receive the set of downlink control information messages, the one or more processors are individually or collectively operable to execute the code to cause the apparatus to:
receive a third downlink control information message of the set of downlink control information messages, wherein the third downlink control information message comprises the first format that includes the group index field, and wherein the first downlink control information message is identified as the last downlink control information message of the set of downlink control information messages based at least in part on the first downlink control information message corresponding to a first monitoring occasion that is after a second monitoring occasion corresponding to the third downlink control information message.

22. The apparatus of claim 13, wherein the one or more processors are individually or collectively further operable to execute the code to cause the apparatus to:
determine that the first downlink control information message comprises the last downlink control information message having the first format that includes the group index field based at least in part on an index associated with a monitoring occasion corresponding to the first downlink control information message.

23. The apparatus of claim 13, wherein the first format comprises downlink control information format 1_1.

24. The apparatus of claim 13, the second format comprises downlink control information format 1_0.

25. A non-transitory computer-readable medium storing code for wireless communication, the code comprising instructions executable by one or more processors to:
receive a set of downlink control information messages scheduling one or more groups of downlink transmissions, the set of downlink control information messages including at least a first downlink control information message and a second downlink control information message, wherein the first downlink control information message comprises a first format that includes a group index field, and wherein the second downlink control information message comprises a second format that excludes the group index field; and
transmit a feedback message for at least a first group of the one or more groups, the feedback message comprising a codebook including feedback information for at least the first group in accordance with a value indicated by the group index field of the first downlink control information message, wherein the value indicated by the group index field of the first downlink control information message is used for the codebook based at least in part on the first downlink control information message comprising a last downlink control information message having the first format that includes the group index field.

26. The non-transitory computer-readable medium of claim 25, wherein the instructions are further executable by the one or more processors to:
set a downlink assignment index value for a second group of the one or more groups that is different from the first group, wherein the downlink assignment index value for the second group is indicated by a field of the first downlink control information message in accordance with the first downlink control information message comprising the last downlink control information message having the first format that includes the group index field, and wherein the codebook is based at least in part on the downlink assignment index value for the second group.

27. The non-transitory computer-readable medium of claim 25, wherein the second downlink control information message is received after the first downlink control information message, and the instructions are further executable by the one or more processors to:
set a downlink assignment index value for a second group of the one or more groups different from the first group, wherein the downlink assignment index value for the second group is set to a predetermined value based at least in part on the group index field indicating the first group, and wherein the codebook includes feedback information for the second group based at least in part on the downlink assignment index value for the second group.

28. The non-transitory computer-readable medium of claim 25, wherein the second downlink control information message is received after the first downlink control information message, and the instructions are further executable by the one or more processors to:
set a downlink assignment index value for a second group of the one or more groups that is different from the first group, wherein the downlink assignment index value for the second group is indicated by a field of the first downlink control information message based at least in part on the second downlink control information message comprising the second format that excludes the group index field.

29. The non-transitory computer-readable medium of claim 25, wherein the value indicated by the group index field comprises a first value, and the instructions are further executable by the one or more processors to:
multiplex the feedback information for the first group and feedback information for a second group of the one or more groups in the feedback message, wherein the multiplexing is based at least in part on the first value and a number of requested groups indicated by a field of the first downlink control information message, and wherein the second group is different than the first group.

30. An apparatus for wireless communication, comprising:
means for receiving a set of downlink control information messages scheduling one or more groups of downlink transmissions, the set of downlink control information messages including at least a first downlink control information message and a second downlink control information message, wherein the first downlink control information message comprises a first format that includes a group index field, and wherein the second downlink control information message comprises a second format that excludes the group index field; and
means for transmitting a feedback message for at least a first group of the one or more groups, the feedback message comprising a codebook including feedback information for at least the first group in accordance with a value indicated by the group index field of the first downlink control information message, wherein the value indicated by the group index field of the first downlink control information message is used for the codebook based at least in part on the first downlink control information message comprising a last downlink control information message having the first format that includes the group index field.

* * * * *